(12) United States Patent
Chan

(10) Patent No.: US 11,127,266 B2
(45) Date of Patent: Sep. 21, 2021

(54) LUMINAIRE COMMUNICATION, DETECTION AND/OR LOCATION APPARATUS AND SYSTEM

(71) Applicant: INDOORSIGHTS LIMITED, Epsom (NZ)

(72) Inventor: Paul Kim Chan, Epsom (NZ)

(73) Assignee: Indoorsights Limited, Auckland (NZ)

( * ) Notice: Subject to any disclaimer, the term of this patent is extended or adjusted under 35 U.S.C. 154(b) by 0 days.

(21) Appl. No.: 16/642,950

(22) PCT Filed: Aug. 28, 2018

(86) PCT No.: PCT/IB2018/056538
§ 371 (c)(1),
(2) Date: Feb. 28, 2020

(87) PCT Pub. No.: WO2019/043563
PCT Pub. Date: Mar. 7, 2019

(65) Prior Publication Data
US 2020/0352008 A1 Nov. 5, 2020

(30) Foreign Application Priority Data
Aug. 28, 2017 (AU) .................................. 2017903463

(51) Int. Cl.
*H05B 39/00* (2006.01)
*G05B 1/00* (2006.01)
(Continued)

(52) U.S. Cl.
CPC .............. *G08B 7/066* (2013.01); *F21S 9/022* (2013.01); *G08B 3/1025* (2013.01); *G08B 5/223* (2013.01);
(Continued)

(58) Field of Classification Search
CPC ...... H05B 47/19; H05B 47/115; G08B 7/062; G08B 3/1025; G08B 5/223; H02J 9/061; H04W 4/90; F21S 9/022
See application file for complete search history.

(56) References Cited

U.S. PATENT DOCUMENTS 4,694,285 A 9/1987 Scripps
6,583,521 B1 * 6/2003 Lagod ..................... H02J 3/005
307/70
(Continued)

FOREIGN PATENT DOCUMENTS

WO 2016/079707 A2 5/2016

OTHER PUBLICATIONS

International Search Report issued in PCT/IB2018/056538; dated Nov. 29, 2018.
(Continued)

*Primary Examiner* — Minh D A
(74) *Attorney, Agent, or Firm* — Studebaker & Brackett PC

(57) ABSTRACT

A luminaire and network for use in assisting persons in a building comprising: at least one lighting module, at least one communications component, a controller, an uninterruptible power supply in or coupled to the luminaire to power the lighting module, communications component and/or controller in the absence of a regular (e.g. AC) power supply, wherein the controller: triggers the lighting module to illuminate upon an activation event, facilitates communication via the communications and/or facilitates positioning of persons (or their devices) using the communications component and/or other components.

18 Claims, 27 Drawing Sheets

(51) Int. Cl.
  *G08B 7/06* (2006.01)
  *H04W 4/90* (2018.01)
  *H05B 47/115* (2020.01)
  *H05B 47/19* (2020.01)
  *F21S 9/02* (2006.01)
  *G08B 3/10* (2006.01)
  *G08B 5/22* (2006.01)
  *H02J 9/06* (2006.01)
  *H05B 47/13* (2020.01)

(52) U.S. Cl.
  CPC .............. *G08B 7/062* (2013.01); *H02J 9/061* (2013.01); *H04W 4/90* (2018.02); *H05B 47/115* (2020.01); *H05B 47/19* (2020.01); *H05B 47/13* (2020.01)

(56) References Cited

U.S. PATENT DOCUMENTS

| | | |
|---|---|---|
| 8,547,036 B2 | 10/2013 | Tran |
| 8,774,707 B2 | 7/2014 | Flammer, III et al. |
| 9,123,221 B2 | 9/2015 | Puskarich |
| 9,265,112 B2 | 2/2016 | Pederson |
| 9,408,282 B1 * | 8/2016 | Springer ............... F21V 19/006 |
| 9,536,407 B2 | 1/2017 | Todasco et al. |
| 9,746,542 B2 | 8/2017 | Ikehara et al. |
| 2004/0192227 A1 | 9/2004 | Beach |
| 2010/0226481 A1 | 9/2010 | Tischer et al. |
| 2014/0340222 A1 | 11/2014 | Thornton et al. |
| 2015/0119071 A1 | 4/2015 | Basha et al. |
| 2015/0250042 A1 | 9/2015 | Aggarwal et al. |
| 2015/0271375 A1 | 9/2015 | Chien |
| 2017/0080883 A1 * | 3/2017 | Yasunori ............... H02J 7/0063 |
| 2017/0223807 A1 * | 8/2017 | Recker ............. H02J 13/00017 |

OTHER PUBLICATIONS

Written Opinion issued in PCT/IB2018/056538; dated Nov. 29, 2018.

* cited by examiner

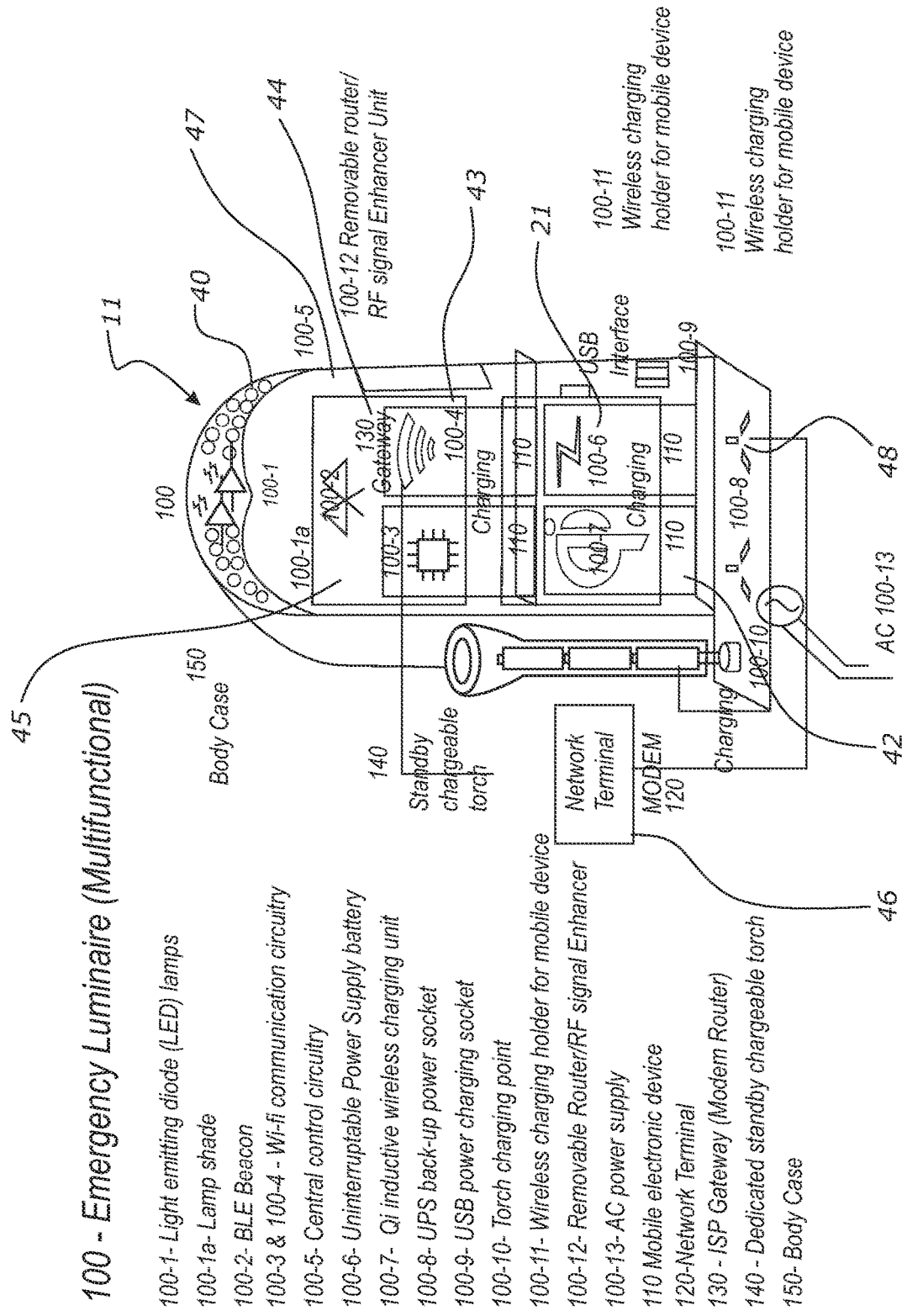

*FIGURE 3B*

100 - Emergency Luminaire (Multifunctional)

100-1- Light emitting diode (LED) lamps
100-1a- Lamp shade
100-2- BLE Beacon
100-3 & 100-4 - Wi-fi communication circuitry
100-5- Central control circuitry
100-6- Uninterruptable Power Supply battery
100-7- Qi inductive wireless charging unit
100-8- UPS back-up power socket
100-9- USB power charging socket
100-10- Torch charging point
100-11- Wireless charging holder for mobile device
100-12- Removable Router/RF signal Enhancer
100-13- AC power supply
110 Mobile electronic device
120-Network Terminal
130 - ISP Gateway (Modem Router)
140 - Dedicated standby chargeable torch
150- Body Case 1), To install the removable unit by pressing 'Spring lock/stopper' upward before pushing the body inward against the spring 1 which pushes the body into the fit in notch, while the spring safety lock keeps the body in place:

2), Springs of 2,3 hold the removable unit in place in the notch;

3), To remove the unit, first unlock the 'Spring safety lock/stopper' before pushing the body against spring 1 and lift the body up before spring 1 bounces the body outward.

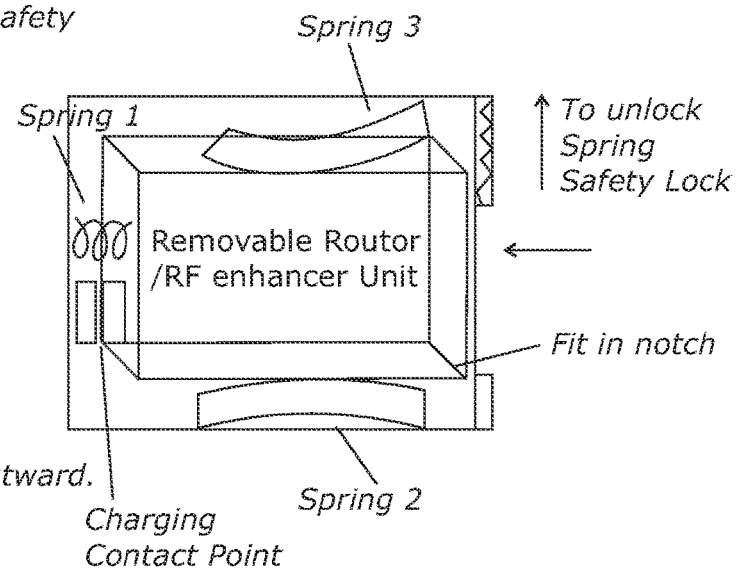

FIGURE 6 catcher catcher release in power-cut

LUMINAIRE COMMUNICATION, DETECTION AND/OR LOCATION APPARATUS AND SYSTEM

FIELD OF THE INVENTION

The present invention relates to luminaires configured to enable communications, detection and/or positioning/location functionalities, and a system such luminaires.

BACKGROUND OF THE INVENTION

Loss of power and lighting can occur in buildings putting occupants at risk, especially when they cannot communicate and/or cannot be found. This can occur, for example, in emergency situations. Such emergency situations can be, for example, natural disasters, such as earthquakes, floods volcanic eruptions, storms and the like; or other emergencies such as fires, power cuts, terror attacks, criminal attacks, or person health emergencies and the like.

In such situations, persons in the building may be in need of assistance, such as rescue. However, often it is difficult for emergency services, or other assistance to be provided as it is not known where the persons are and/or they cannot be communicated with. This is because regular power supply and/or regular communications infrastructure is unavailable and/or environmental conditions (such as smoke) restrict assistance.

SUMMARY OF THE INVENTION

It is an object of the invention to provide an apparatus and/or system to assist people in a building, for example during an abnormal event such as an emergency situation For example, embodiments of the invention could assist with reporting positions or alerts, presence of persons and their movements in real time.

A building could be, but is not limited to, an apartment, commercial office block, house, office, shop, hotel, or the like.

In one aspect the present invention may comprise a luminaire for use in assisting persons in a building comprising: at least one lighting module, at least one communications component, a controller, an uninterruptible power supply in or coupled to the luminaire to power the lighting module, communications component and/or controller in the absence of a regular (e.g. AC) power supply, wherein the controller: triggers the lighting module to illuminate upon an activation event, facilitates communication via the communications and/or facilitates positioning of persons (or their devices) using the communications component and/or other components.

Preferably the luminaire further comprises at least one persons detection and/or positioning component, wherein the controller utilises the persons detection and/or position component to detect a person in a building and/or determining the position of a person in the building.

Preferably each communications component comprises one or more communications components being one or more of: a Wi-Fi transceiver, an internet gateway, a 3GPP transceiver, Bluetooth transceiver, removable modem router/RF signal enhancer using IEEE 802.11 networking standards.

Preferably each person's detection and/or positioning component comprises one or more components being one or more of: proximity sensor, motion detector, GPS transceiver, BLE beacon, Wi-Fi transceiver.

Preferably the controller can facilitate communications between a mobile communications device on a person in the building and a third party (e.g. outside the building) using one or more of the communications component(s).

Preferably the controller can detect a person and/or determine the location of a person in a building, and/or communicate the detection and/or location of the person to a third party (e.g. outside the building) using optionally the communications component(s).

Preferably the activation event is an emergency event.

Preferably the uninterruptible power supply is a battery, the battery preferably comprising two battery units, wherein at least one battery unit is removable/detachable from the luminaire.

Preferably the luminaire further comprises a wireless charging module for charging the uninterruptible power supply and/or for charging peripheral devices.

Preferably the luminaire further comprises one or more of: one or more power sockets for powering external devices, optionally from the uninterruptible power supply, a chargeable torch removably coupled to the luminaire and/or triggered to illuminate on an activation event, an AC power supply.

Preferably the luminaire further comprises a fixture box to hold the luminaire for mounting in/on a wall.

Preferably the uninterruptible power supply is configured to: operate in a first mode of operation for a first period of time; and operate in a second mode of operation for a second period of time.

Preferably in the first mode, the uninterruptible power supply provides power to all components in the luminaire; and in the second mode the uninterruptible power supply provides power to a subset of components powered by the uninterruptible power supply operating in the first mode.

Preferably in the first mode, the uninterruptible power supply provides power to: the at least one lighting module, the at least one communications component, at least one persons detection and/or positioning component, a Bluetooth beacon, a gateway router, and the controller; in the second mode, the uninterruptible power supply provides power to: the at least one persons detection and/or positioning component, the Bluetooth beacon, and the controller; wherein the uninterruptible power supply is configured to switch from operating in the first mode to the second mode when power is running out; and wherein the controller is configured to be powered by the uninterruptible power supply at all times.

Preferably the uninterruptible power supply is removable and/or detachable.

Preferably the luminaire is located outside of the building.

In another aspect the present invention may be said to consist in a system for assisting persons in a building during an event comprising: a network of luminaires, wherein the network of luminaires can be controlled to: trigger the lighting modules to illuminate upon an activation event, facilitate communication via the communications modules, and/or utilise the persons detection and/or position module to detect a person in a building and/or determining the position of a person in the building.

In such situations, it is desirable to be able to detect persons, determine the position of persons and/or enable communications with persons in the building. However, usual telecommunications and/or positioning devices do not always work. Providing backup systems can be expensive, and may not be warranted. Providing power back up for communication channels and electronic devices is also desirable, such as for network terminals, access points, mobile devices and the like.

Typically, buildings have emergency lighting systems (luminaire systems) to provide emergency lighting when an event occurs. These have their own independent power supplies, such as uninterruptible power supplies, to enable provision of lighting, even if the regular power supply has failed. The present inventor has determined how to utilise such an emergency lighting system network and/or the luminaire signage point of interest (e.g. toilet, information point, lift, etc.) system network to provide additional services. Embodiments disclosed herein provide a device and/or system to assist communication and location/detection of persons on a building in an event by leveraging off the existing emergency luminaire lighting devices and network.

BRIEF LIST OF DRAWINGS

Embodiments will be described with reference to the following drawings, of which:

FIG. 3B shows in diagrammatic block form an exemplary embodiment of a luminaire use in the network of FIG. 3A.

FIG. 6 shows in diagrammatic form the configuration of removable communications components for use with the luminaire of FIG. 5.

DETAILED DESCRIPTION OF EMBODIMENTS

Overview

Figure 1:
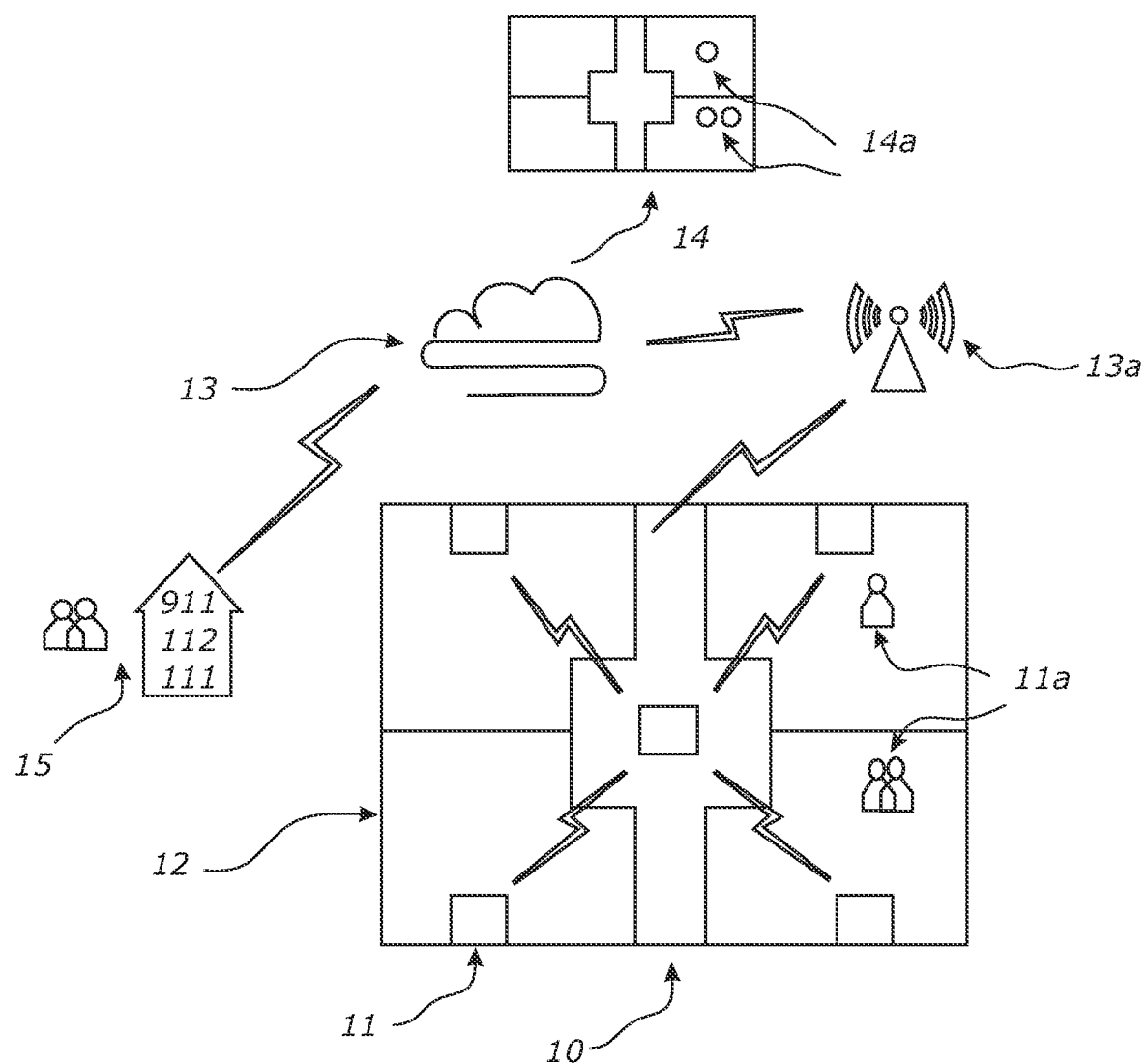
FIG. 1 shows in diagrammatic form a building floor plan with a network of luminaires configured with communications and/or location functionalities for locating Persons on a building and/or allowing for communications from the persons.

FIG. 1 shows the floor plan of a building 10 level with a system/local area network comprising a network 12 of luminaires 11 in general block diagram form that have been configured as described herein to provide communications, person detection and/or person location/positioning functionalities. It also provides power backup for supporting these functionalities and external mobile devices. The luminaires are mounted in a suitable location and provide an emergency lighting network that illuminate upon occurrence of an event, such as a natural disaster or human triggered emergency situation. Such luminaires provide lighting to assist persons 11a in the building during such an event. For example, such luminaires can be typically within reach by persons 11a in an emergency situation such as floor, wall at appropriate height that is reachable by a person 11a, and/or ceiling. They predominantly cover the following areas with lighting and/or communication coverage: exit/entrance, fire access, stairways, corridors, passages and confined spaces/rooms.

In brief, luminaires 11 are configured to come on (activate) in an event, such as an emergency situation, to provide lighting (such as emergency lighting) to enable people to navigate and leave the building. The luminaires have their own power supply, such as an uninterruptible power supply (UPS) that allows for operation of the luminaires even if the regular grid/AC power supply is cut off. Luminaires typically activate and provide emergency lighting in situations such as black outs, fires, earthquakes and other natural disasters or situations where normal power/communications are cut.

The luminaires 11 described herein are modified/configured to comprise additional functionality that leverages off the functionality and infrastructure provided by existing luminaires 11 and luminaire networks 12. As emergency lighting systems using luminaires are typically provided in buildings, leveraging off these to provide additional location, detection and communication functionality enables assistance to be provided to persons 11a in a building during an event or otherwise, where otherwise such an infrastructure would not be warranted. For example, the network of luminaires 12 could be used in emergency situations to locate persons 11a in a building and/or allow those persons 11a to communicate with third parties in the building or the outside world. The modified luminaires can provide a local area network for communications, persons detection and/or persons location/positioning. The positioning functions can leverage off communication components such as BLE and Wi-Fi.

In particular, one or more of the luminaires in the network is configured with communication functionality that allows persons 11a in the building to instigate communications with third parties (such as emergency services 15, and/or Public Safety Answering Point in the US) inside or outside the building, even if the usual telecommunications systems (such as Internet, mobile telephony services and/or landline telephony services) are not functioning. The communications functionality enables persons 11a in the building to send alerts, text messages, voice/video messages, or any other data or communications to those third parties, for example using a personal mobile communications device such as a mobile telephone. This enables them to obtain assistance, indicate their whereabouts and existence, and generally provide/receive information with those in the outside world during the event/emergency. In addition, the luminaires 11 are configured with location functionalities that enable detection of persons 11a and/or detection or identification of their position within the building, using an indoor virtual map 14 labelling the persons as 14a, for example. This information can then be relayed to third parties inside or outside, so that it can be ascertained who needs assistance and to provide assistance, such as rescue. The functionalities can also be utilised in non-emergency situations, also. One or luminaires in the network can be configured as a master, and others as slave devices.

Figure 2:
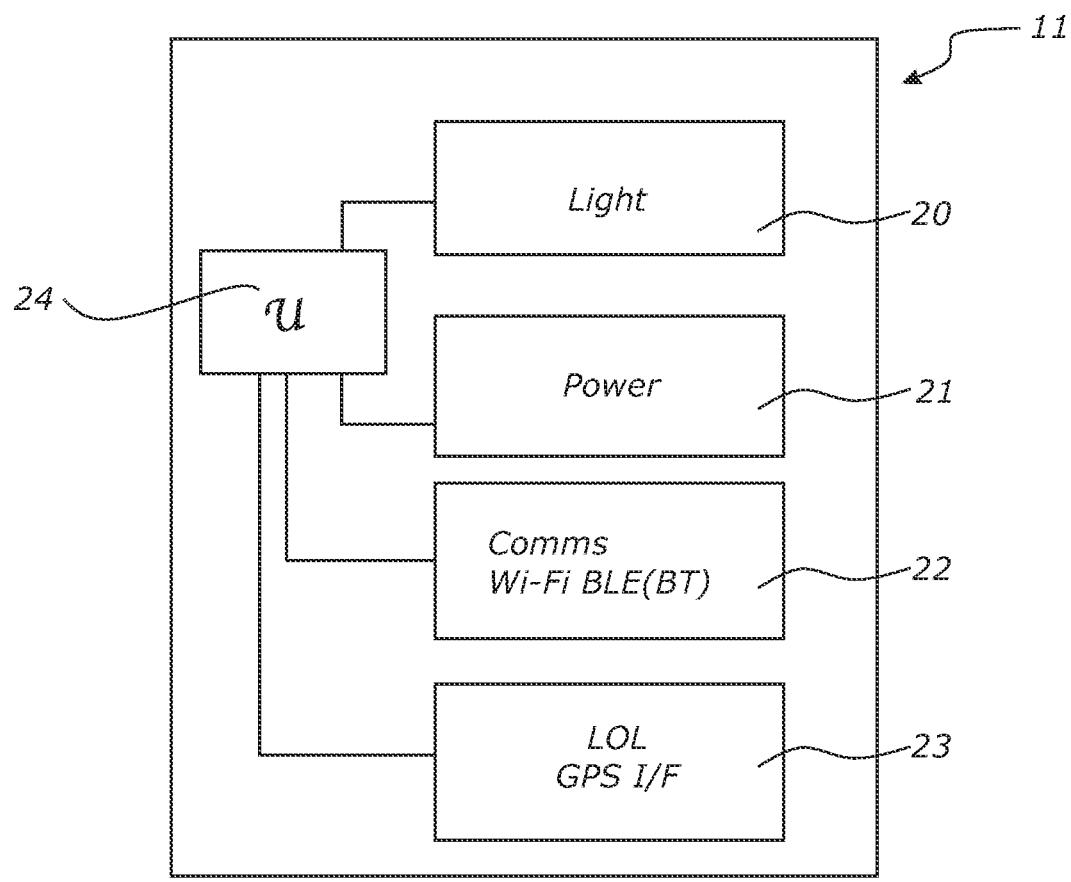
FIG. 2 shows in diagrammatic block form an example of a luminaire configured with emergency lighting, an uninterruptible power supply, communications functionality and location services, using BLE and WIFI, LiFi and/or other scope of technology using mobile devices built-in sensors including magnetometer, gyroscope, barometer and accelerometer etc.

FIG. 2 shows in general block diagram form a luminaire 12 configured to provide the communications and/or location/positioning functionalities. The luminaire comprises at least one (e.g. emergency) lighting module 20, an uninterruptible power supply 21, such as a UPS (e.g. a battery), at least one communications module 22 comprising one or more communications components, and at least one detection and/or positioning module providing one or more positioning/detection components, including PIR detector which might be triggered to function on a power outage. The communication components can be one or more of Wi-Fi, Bluetooth (e.g. Bluetooth low energy—BLE) or the like. The location/positioning components can be one or more of BLE Beacons, Wi-Fi, GPS, Infrared sensing or the like working with typical built in sensors in mobile devices. These can detect/locate/position persons 11a and/or mobile devices on a person 11a to report via the luminaire communications positioning/detection of persons 11a via the communications channels. The combination of the luminaire functionality and the mobile device and its sensors enable the detection/location/positioning of persons 11a. Other components and features can be provided, and these will be described in more detail later. A controller 24 is provided to control functionality and components of the luminaire. Not all components described necessarily need be provided, and a subset of them may exist only.

Each luminaire 11 can communicate as necessary with the other luminaires 11 through wired (which may be referred to as "wireline" in description or drawings) or wireless networks 11, e.g. using Bluetooth and/or Wi-Fi communications. Each luminaire 11 in the network 12, can be a master or slave luminaire, and a master luminaire can communicate via a suitable means such as wired or wireless network to third parties, and can control communications in the luminaire network 12 itself. For example, the master luminaire 12 can communicate with outside parties via a telecommunications network 13a through the system's internet data/computer network server 13. The outside parties might be emergency services 15, property managers, building security, or the like.

The luminaires 11, and the network 12 of luminaires, can work in a situation when ordinary telecommunications, such as landlines, mobile telephones, Wi-Fi and Internet networks, GPS or other location and/or communications services and the like will not operate. The modified luminaire 11 utilises the emergency power supply of the luminaire to operate the communications and positioning/detection modules, which will provide emergency communication channels when the ordinary communication channels are not working due to power cuts.

Exemplary embodiments of the system and luminaire will now be described. A first embodiment relates a luminaire with a single UPS (uninterruptible power supply), and a second embodiment relates to a luminaire with a second UPS as further backup. It will be appreciated that these are non-limiting examples.

Exemplary Embodiment—Single UPS Wall Mounted Luminaire

Figure 3A:
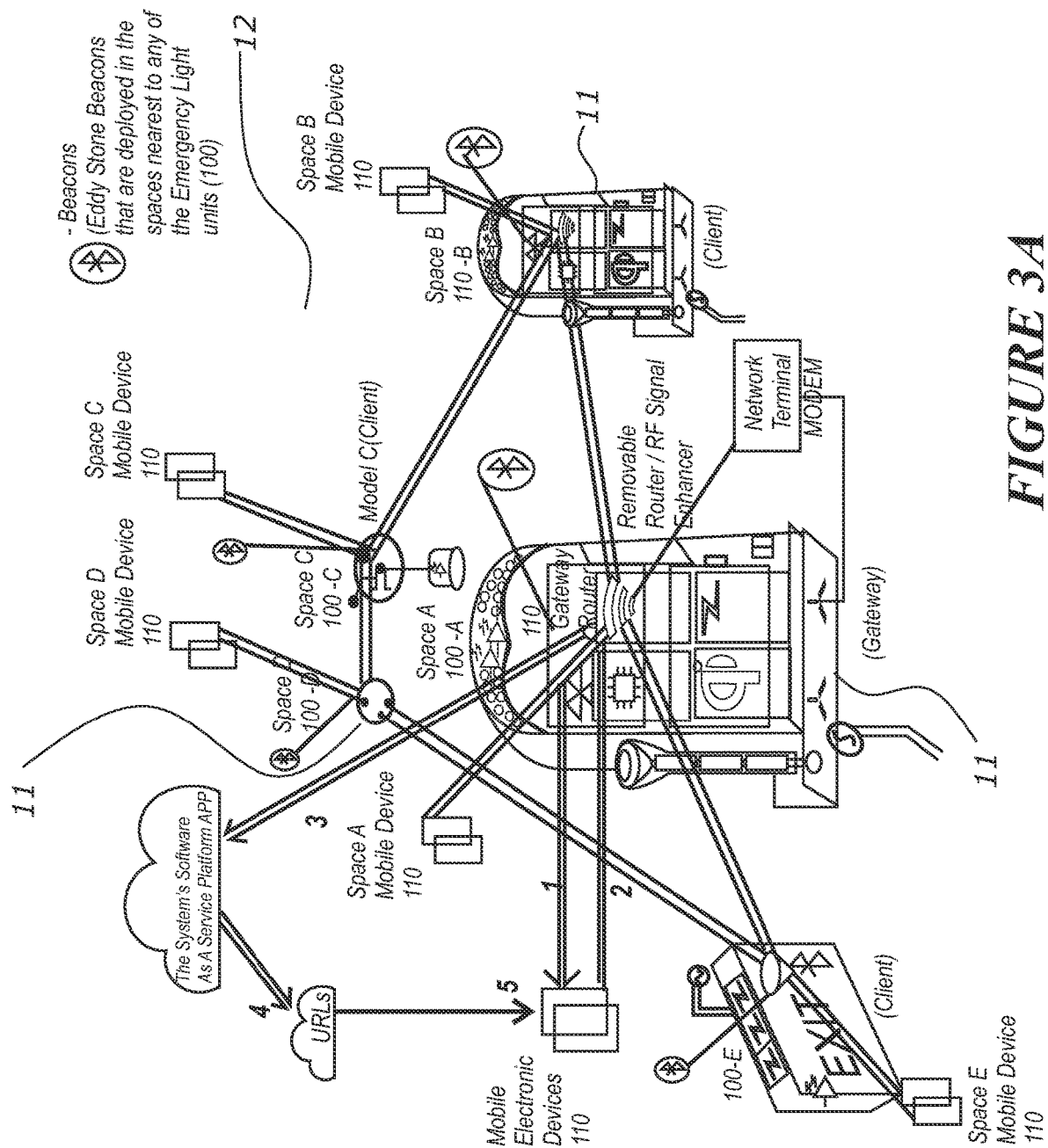
FIG. 3A shows in diagrammatic block form an exemplary embodiment of a network of luminaires configured according to embodiments described herein for providing communications and/or location functionalities.

A first embodiment will now be described with reference to FIGS. 3A, 3B. FIG. 3A shows one possible embodiment of a lighting, power backup, location/detection and communication system comprising a luminaire network 12 using modified luminaires 11 as discussed. FIG. 3B shows one possible embodiment of a corresponding luminaire 11 used in the network/system. The network 12 comprises two wall mounted luminaire modules 11 (master/slave), by way of example and as shown in FIG. 3B, which are placed within the building space 12 and can communicate with each other. Two such luminaire modules 11 are shown by way of example, but it will be appreciated that any suitable number of luminaire modules could be provided to adequately provide coverage and functionality to the building in which the network is installed. In addition to the wall mounted luminaire modules, other luminaires (also configured with communication and location functionality but packaged in a different form) 11 can be provided also. For example, two ceiling mounted luminaire modules 11 can be provided, along with an emergency exit sign luminaire module. Some or all of the luminaire modules 11 can be configured with communications, location/positioning and/or detection functionalities, and can all communicate with each other in a network to provide the system. Any or all of the luminaire modules 11 can communicate with mobile communications devices, such as mobile telephones carried by persons 11a in the building. The luminaire modules 11 enable communication from the mobile devices to third parties through a communications or other network. This could be through Internet, mobile communications technologies or other network communications technologies. The outside parties can communicate in any suitable manner, using telephony, VOIP, apps, servers, data or any other suitable technologies.

FIG. 3B shows the wall mounted luminaire module 11 in more detail. It comprises a housing 40. A controller 47 is provided to control the components and overall functionality of the luminaire module. The luminaire module 11 comprises an emergency power supply 21, in this case in the form of an uninterruptible power supply, in the form of a battery. There may also be an inductive wireless charging unit 42 for charging the uninterruptible power supply or peripheral components and/or external devices such as mobile telephones from the UPS. The luminaire 11 has lighting 20, in the form of light emitting diodes (LED), which are powered from the emergency power supply 21. There may also be included appropriate lamp shading. The luminaire module 11 can contain circuitry that triggers/activates when there is an event, such as an emergency, and the lights will be activated and illuminate. For example, this trigger might detect when the normal grid/AC power supply is cut. Alternative forms of triggers could be utilised. For example, it may trigger through mobile device proximity, e.g. mobile smart phone could activate the luminaire to illuminate, and carry out the communications, detection and/or positioning functions.

The luminaire 11 module also has a Wi-Fi communications circuitry (e.g. Wi-Fi access point and/or router) 43 (forming part of a communications module 22), and power by the UPS. It can communicate with a person's mobile telephone or other mobile device. The Wi-Fi router is coupled to an ISP gateway to provide a means for communication via Internet protocol communications to relay communications from a person's mobile communications device via the luminaire network to an outside party. The ISP gateway could be in the luminaire 11 itself (router and/or modem) 44, or alternatively, could be external and connected to the luminaire, in the case of a network terminal and modem 46. A Bluetooth low energy transceiver 45, power by the UPS, is also provided for communications between a person's mobile telephone and the luminaire module.

The Wi-Fi (access point) can also provide positioning functionality. An onboard or off board processor and/or an onsite/offsite server can receive and process/calculate the radio signal strength indicator provided by nearby mobile devices to determine the positions of those mobile devices (and therefore persons 11*a* carrying them) relative to the Wi-Fi access point. In particular, the radio signal (fingerprint) issued from all of the Wi-Fi access point in the areas of the building may be collected/recorded physically/manually to form a data resources to be stored in the server, when a mobile device user approaches any of these areas. The mobile device's MAC ID and Radio Signal Strength Indication (RSSI) fingerprint may be sent to the server to calculate its position relative to the data previously stored in the server. The process of collecting data may be done by subscriber mobile device, when the user installs a luminaire module 11 with help by a software tool kit, which is available from the server's application and to be installed in the user's smart phone. Therefore, data resources of RSSI radio signal (fingerprint) of all the Wi-Fi access points (routers) in relation to the mobile device users may be obtained.

Similarly, the BLE radio signal strength data can be used to determine location of mobile devices/persons 11*a* in the same manner. This positioning information can be communicated to outside parties, using the BLE, Wi-Fi and other communications functionalities of a luminaire over the network of luminaires.

The luminaire can also detect the presence of one or more persons 11*a*, for example through motion, proximity and/or object sensor (e.g. using IR motion sensor, heat sensor or similar).

When a modified slave/sister luminaire 11 detects a real person 11*a* and/or a mobile device, data is stored and processed in the unit's peripheral components before sending over to the master luminaire apparatus's central processor controller 47 to process and send to the server, through which subscribers/users including emergency services 15 can share with a variety of mobile device too.

The luminaire module 11 also has an optional removable router/RF signal enhancer, to improve communications signals.

In addition to the lighting, communications and positioning functionalities, the luminaire 11 can also be configured or adapted to comprise optionally one or more of the following.

It can have a UPS backup power socket 48 for supporting power from the UPS to the nearest network interface device (internet network terminal) and external access point/router/gateway in normal time and in power outage as well. It secures power supply to the communication network terminal of the ISP (internet Service Provider) by connecting such network interface device to its UPS socket. This way, the device can function as normal in a black out in a reasonable time frame, so as to supply uninterruptible power source in a power-cut to secure the internet and Wi-Fi service access for the local area network. The socket 48 can also be used to power other external devices, such as those carried by occupants who may be stranded in the building and may be in need for power to maintain communication in and outside of the building; and more importantly, for revealing his indoor position. The luminaire module 11 can also supply UPS power backup to the modem/router/Wi-Fi.

It can have a USB power charging socket for charging devices, such as mobile communications devices (e.g. mobile telephone). It can also have a wireless charging holder for a mobile communications device. There can be an AC power supply for supplying normal A/C powered appliances or other devices.

There can be an AC power supply for the luminaire itself, which can be hardwired to the mains power supply, or connected via a typical power plug.

It can also have a mobile electronic device holder for receiving and/or charging mobile devices, either through the power socket or via inductive charging; from the UPS or from the mains supply accessible by the luminaire.

A removable router/FR signal enhancer unit can be provider. This can be extracted by a person 11*a* and taken with them to improve/extend coverage and communications from their mobile communications device to the luminaire or to other communications networks.

An emergency torch can be coupled to the luminaire module, which will activate when the lighting is activated. It can be charged from the luminaire power supply.

Not all components described necessarily need be provided, and a subset of them may exist only.

Figure 5:
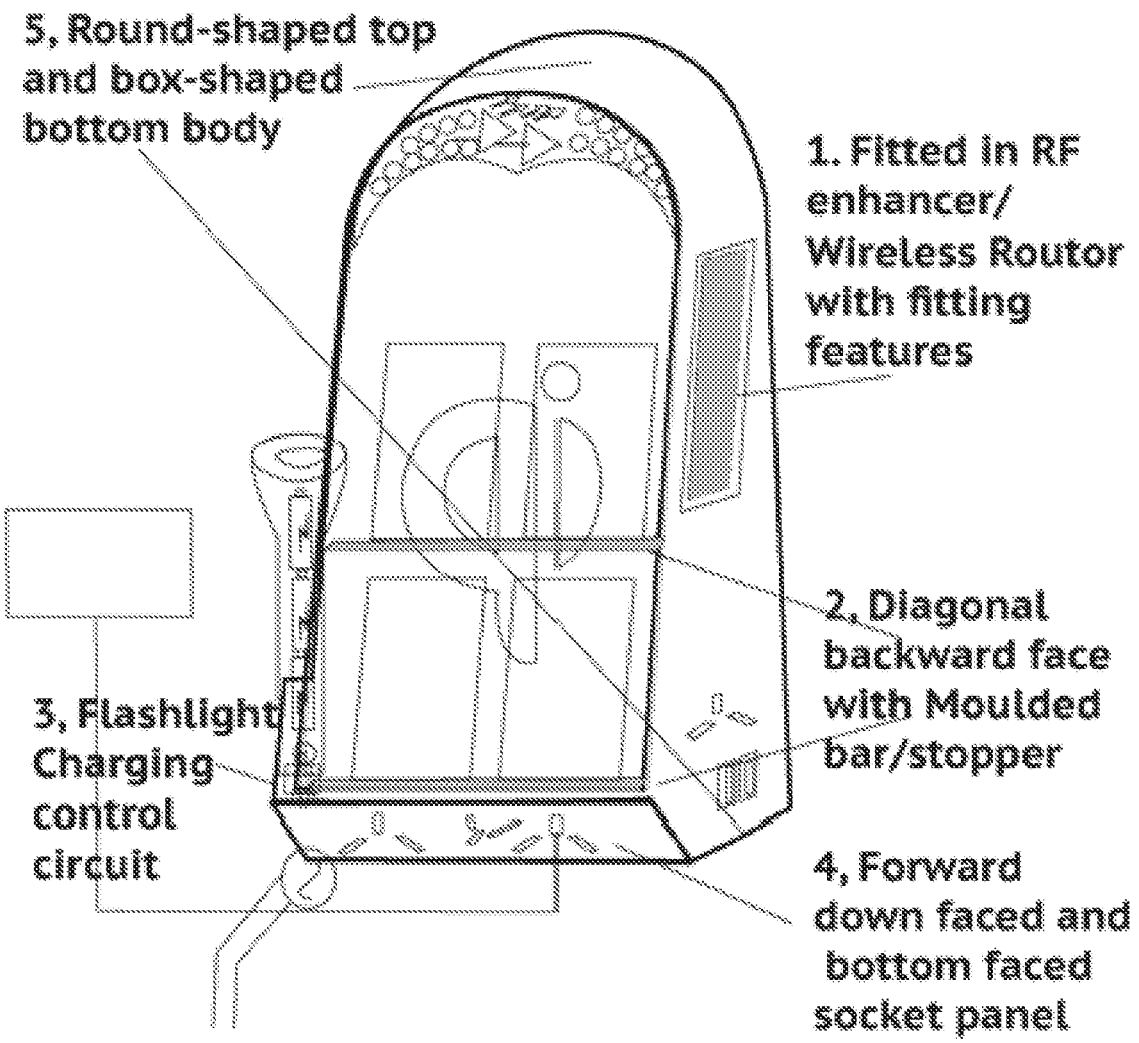
FIG. 5 shows in diagrammatic form an exemplary embodiment of a physical configuration of a luminaire according to embodiments described herein, and with removable communications components.

FIG. 5 shows one possible physical form of the luminaire module. It comprises a housing with a round shape top and box shape bottom body, and RF in hearts/wireless router which is removable and fitted within the body, a torch adapted to attached to the outside of the body, various charging and power ports, and a diagonal backward face with mould bar stopper to facilitate wireless charging for mobile devices.

FIG. 6 shows the removable communications module, which is a press fit/spring fit into the luminaire module housing. The communications module comprises a board with the communications module on it. There is a charging contact point to couple to a corresponding charging point within the housing of the luminaire module. Two springs within the luminaire module housing and 1 spring on the removal unit itself are provided. To install the removable communications module, the spring lock/stopper is pressed upward before pushing the body and would against the spring 1 which pushed the body into the fit and the Notch, while the spring safety lock keeps the body in place. The lateral springs hold the removal communications module in place on the notch. To remove the communications module, the spring safety lock stopper is unlocked before pushing the body against the spring and the body lifts up before bouncing outwards.

Figure 7A:
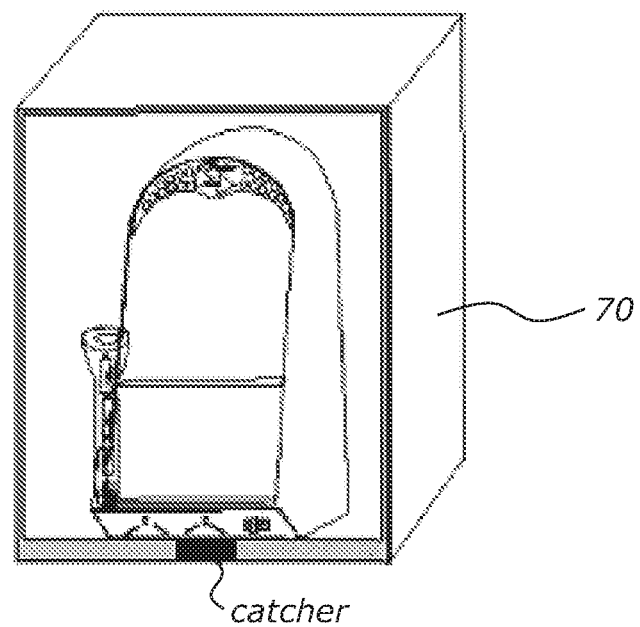
FIG. 7A, 7B shows a housing fixture to house/mount the luminaire, in a wall for example.
Figure 7B:
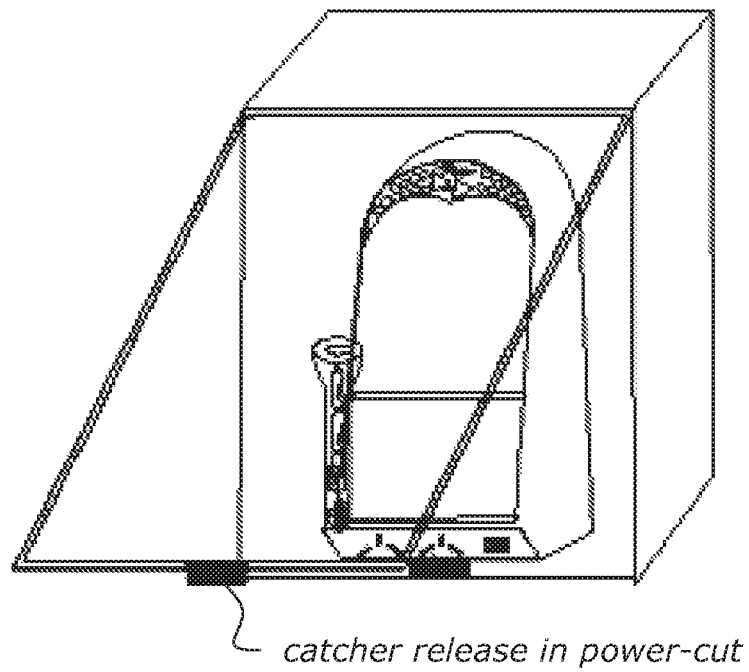

Each luminaire 11 can be mounted in a suitable location, such as on a wall. It can be fitted wall at appropriate height that is reachable by a person 11a at key locations of exit and entrance points, fire access, stairways, corridors, passages and other confined space/room in a building. Referring to FIG. 7, a box or housing fixture 70 can be used to mount each luminaire on a wall or in a recess/cavity in the wall. The luminaire sits within the housing. The face/door of the housing has a catch, such as an electric magnetic-catch door openable upward with the catch on the bottom frame. It may be made with light-weight material of clarity, e.g., clear plastic, with a frame that comes with the electric magnetic catching point/device controlled by the AC power, wherein such face/door is released at AC power failure.

The luminaire can be wired to the AC power supply and/or be connected via a standard power point.

Figure 4A:
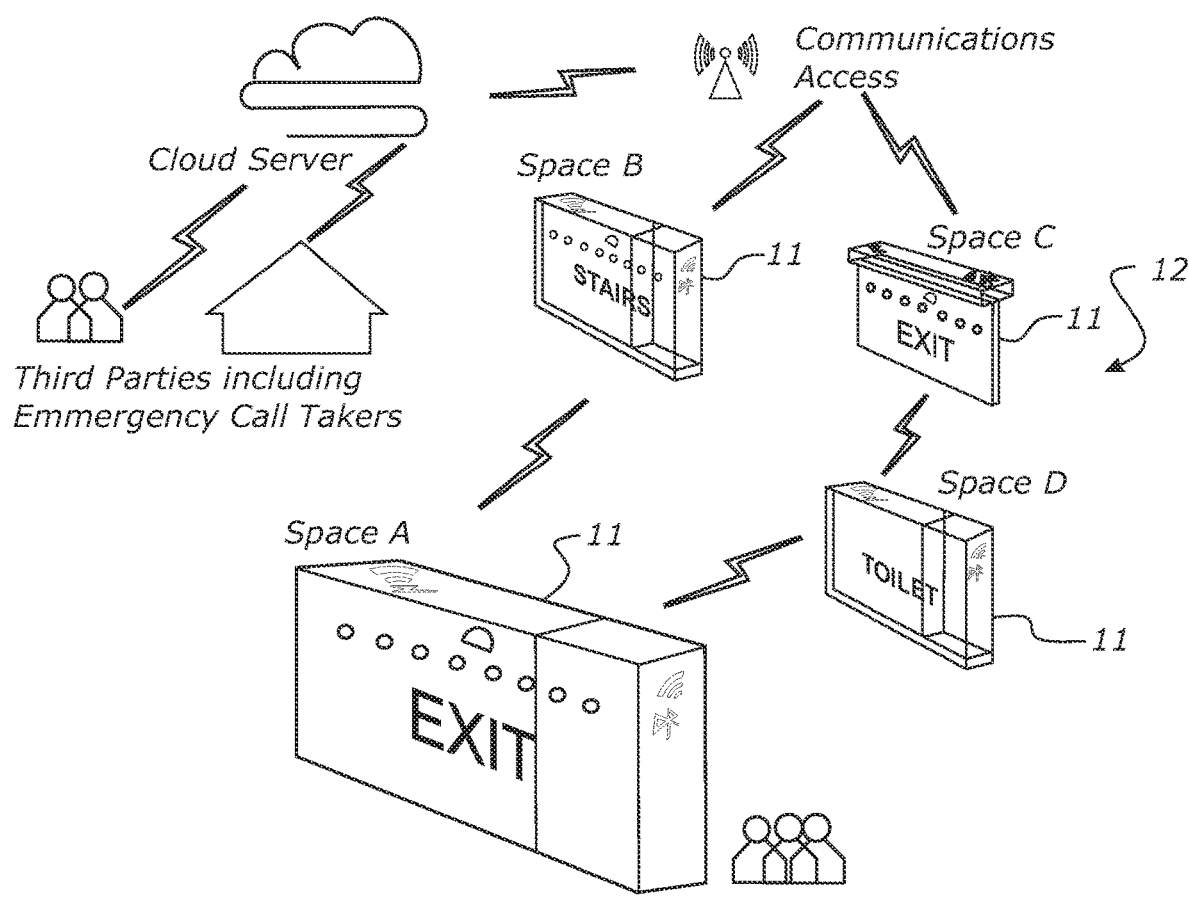
FIG. 4A shows in diagrammatic block form another exemplary embodiment of a network of luminaires configured according to embodiments described herein for providing communications and/or location functionalities.
Figure 4B:
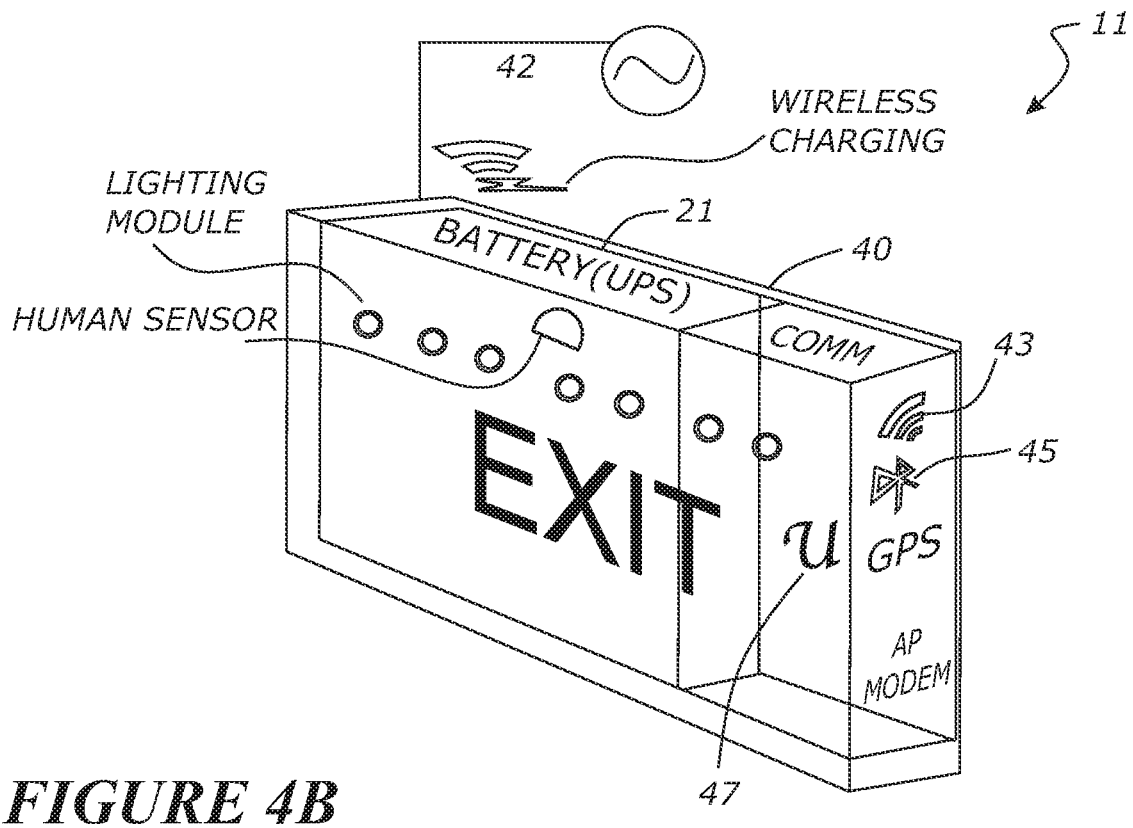
FIG. 4B shows in diagrammatic block form an exemplary embodiment of a luminaire use in the network of FIG. 4A.
Figure 4C:
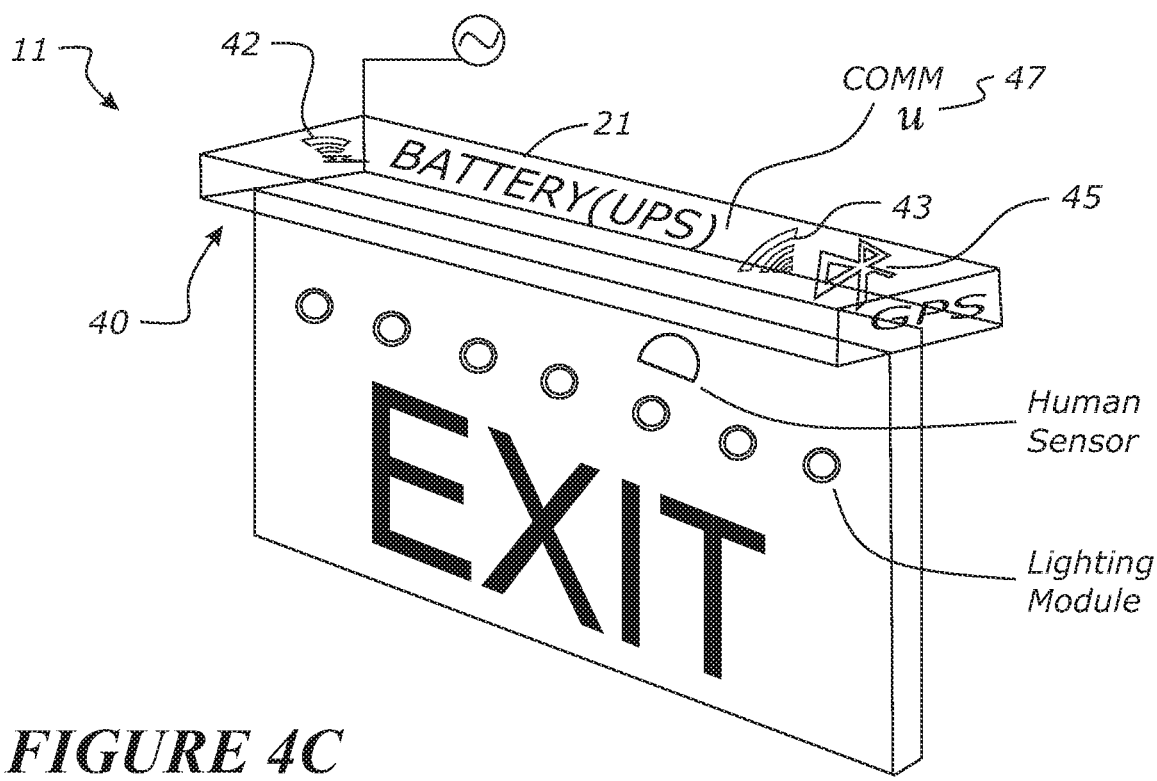
FIG. 4C shows in diagrammatic block form an exemplary embodiment of a luminaire use in the network of FIG. 4A.

This is just one exemplary embodiment of a luminaire and lighting, communications and location/detecting system. Those skilled in the art will appreciate that variations are possible. Some more embodiments are now described Exemplary Embodiment—Single Stage UPS Exit Sign Ceiling Mounted Luminaire FIGS. 4A-4C show an alternative embodiment. This embodiment has many of the same features as the first embodiment, but it has some differences. For example, the embodiment shown in FIGS. 4A-4C does not have a UPS backup power socket 48, nor does it have a USB power charging socket, nor an emergency torch. Other embodiments with different combinations are possible also.

Exemplary Embodiment—Dual UPS Luminaire

Another exemplary embodiment will now be described. This embodiment uses a dual stage UPS (uninterruptible power supply) for additional backup. This could comprise a single UPS with two stages or modes of operation, or a dual UPS with each UPS providing one of two stages or modes of operation (that is, power supply). Many aspects of the embodiment of the same of those previously described, but some description will be made here. Insofar that the embodiment is not fully described, it will be appreciated by those skilled in the art that the description for the embodiments above will be relevant here.

Figure 8:
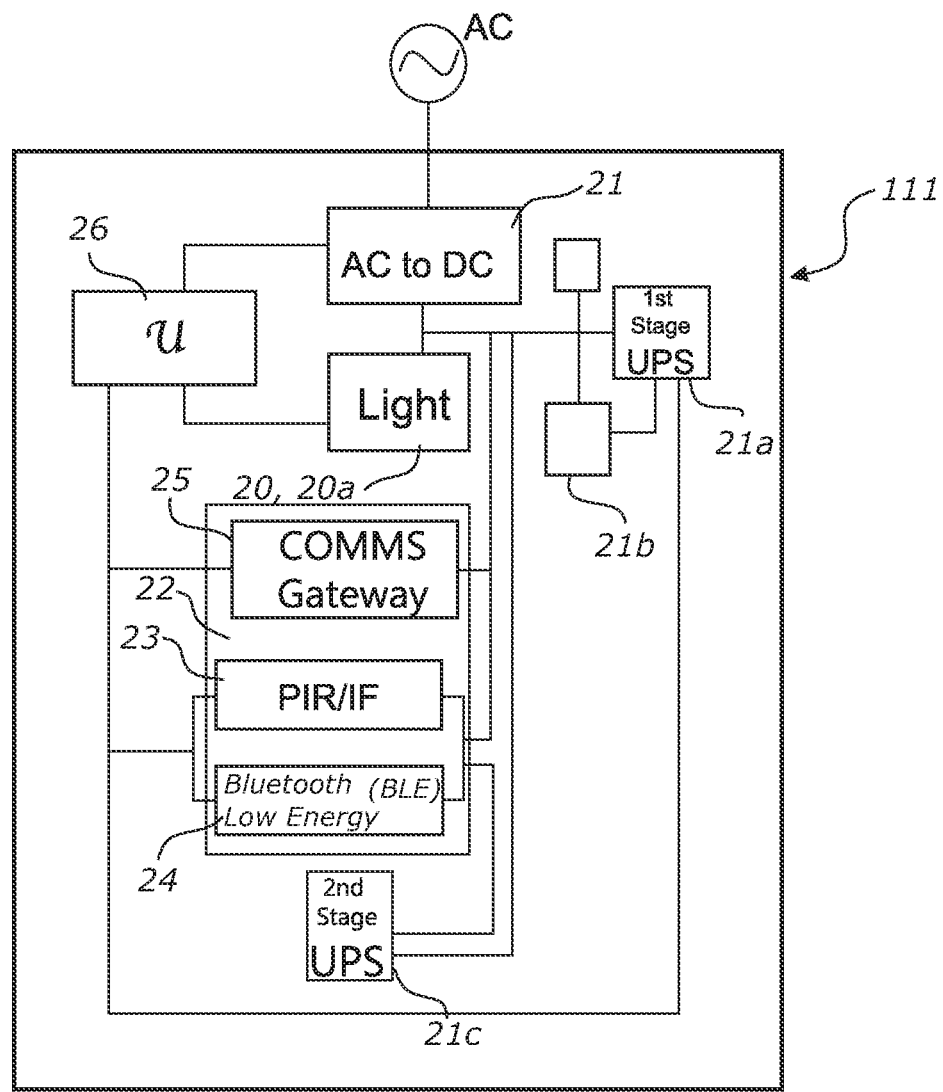
FIG. 8 shows in diagrammatic form a dual stage UPS luminaire embodiment.

FIG. 8 shows in general schematic diagram block diagram form an embodiment of an luminaire 111 configured to provide the communications and/or location/positioning and power backup functionalities for detecting and locating presence of persons on a building and/or allowing for communications and power backup for such communications from the persons. The luminaire 111 comprises at least one (e.g. emergency) lighting module 20 & 20A in the form of light emitting diodes (LED), wherein the lighting module 20A may be activated and illuminated in response to an event, such as an emergency, while the lighting module 20 may be activated to illuminate ambient light at all times.

The luminaire 111 also comprises normal AC to DC power supply and/or converter 21. It also has at least one external AC/DC power point, and/or wireless charging point 21B that provides power backup for internet connection and external peripherals and mobile electronic device, such as internet network terminal, gateway/router, and/or users' mobile devices during both normal times and/or power outages. The luminaire 111 also comprises at least one communications module 22 comprising one or more communications components, and at least one detection and/or positioning module 23 providing one or more positioning/detection components, including motion sensor (e.g. PIR detector, heat sensor or similar), which can be activated during a power outage. The communication components can be one or more of Wi-Fi, Bluetooth (e.g. Bluetooth low energy (BLE) transceiver/transmitter 24, or the like. The communication components can be triggered to function during normal times, and/or when there is a power outage and/or during an emergency event. The communication components may also include one or more of Wi-Fi, BLE gateway for internet connection 25 or the like, which may be detachable from the luminaire 111.

The location/positioning components can interact with a person's mobile device's built-in BLE sensor. The location/positioning components can also detect a person's motion and/or their infrared body heat. The location/positioning components can work in collaboration with one or more of BLE Beacons, Wi-Fi, magnetometer, gyroscope, barometer and accelerometer, infrared sensing, other built-in sensors within mobile devices or the like. The location/positioning components can allow the luminaire 111 to detect/locate/position persons and/or mobile devices on a person.

The luminaire 111 has a UPS that operates in a first stage and a second stage (or two UPSs, one operating in a first stage and one operating in a second stage). Hereinafter, reference to a first and second stage UPS can refer to a single or double UPS arrangement, either of which can provide two stages of operation. Multiple modes of power supplies with multi-stage UPSs for dealing with power outages is provided for all components including lighting and all communication components in the luminaire 111. The second stage UPS supply can simply supply power for maintaining detection and positioning presence of persons until normal power supply resumes. In this way, the second stage UPS can last for longer than the first stage UPS. The first stage can supply power to luminaire 111 (considered to be more energy hungry) for a first time period, whereas the second stage UPS can supply the less power demanding detection and positioning and communications functions, and therefore can power the detection/positioning/communication functions for a second time period, that is preferably a much longer period of time than the first time period. In normal time AC power supply of 21 is the power supplier; while during power outages, the first stage UPS is activated to support lighting elements and all communication and sensing components. If the UPS is running low on power, the UPS may switch from operating in the first stage to operating in the second stage so that the luminaire 111 can continue to detect radio frequency signals from mobile devices, and continue to detect body movement. The second stage provides a power source for the detecting, positioning and location functionality before normal power supply resumes. The UPS may optionally be removable/detachable from the luminaire 111. The UPS may comprise two battery units, with at least one battery unit being removable/detachable from the luminaire 111.

A controller 26 is provided to control functionality and components of the luminaire 111. A standby detachable and chargeable torch 27 is provided.

Not all components described necessarily need be provided, and a only subset of them may exist.

Figure 9:
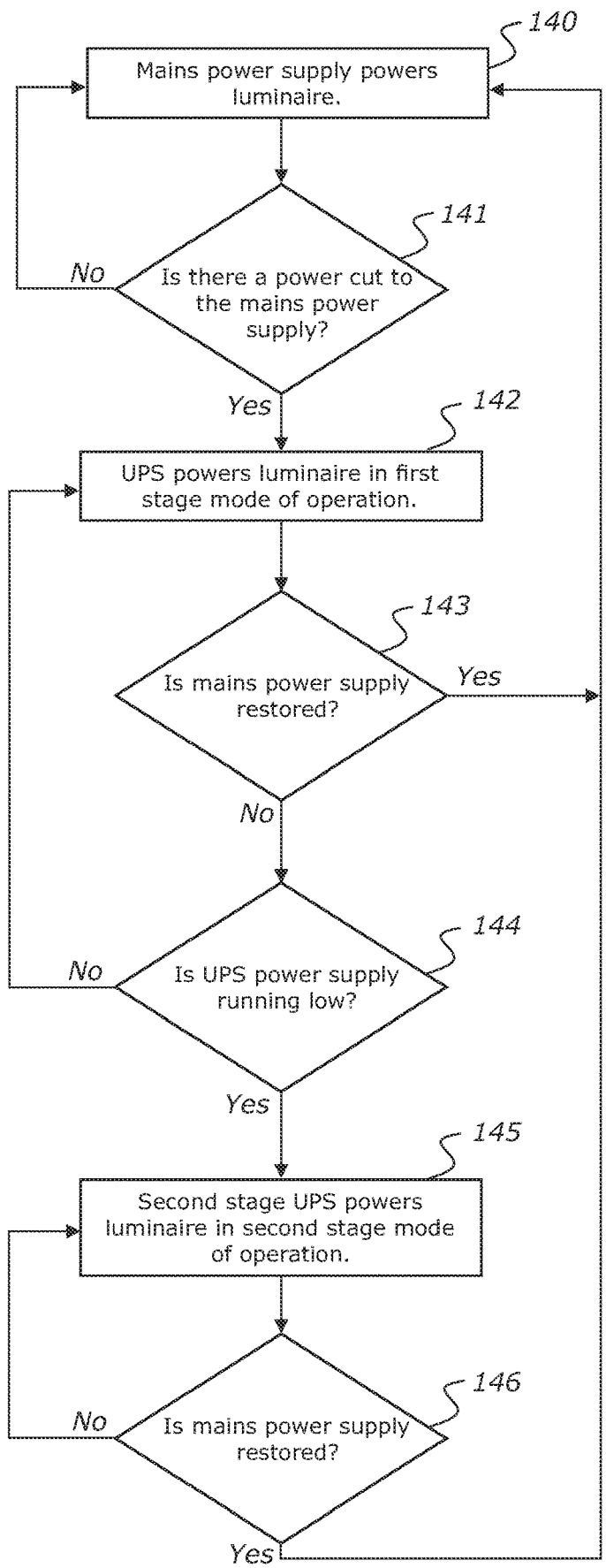
FIG. 9 is a flow diagram of how power supply is controlled in a dual stage UPS luminaire embodiment.

FIG. 9 shows a flow chart of the operation of the dual stage UPS luminaire 111. The operation of the dual stage UPS is controlled by the controller. Discussion will now turn to how a multi-stage UPS can improve the reliability of the luminaire 111 by way of example with reference to FIG. 9. In overview, the dual stage UPS provides 2 stages or modes of operation whereby in the first stage/mode for a particular (first) time period backup power is provided to all aspects of the luminaire including functionalities provided by the lighting module 20, communications module 22, motion detector 23, Bluetooth beacon 24, gateway router 25 and controller 26; and whereby in the second stage/mode, for a second time period following the first time period only a subset of the components are powered, being a subset of components that are more important for providing location and/or communication functionality including but not limited to motion detector 23, Bluetooth beacon 24, and controller 26. In the first time period, all functionality is powered, wherein in the second time period, only a subset of the more critical components are powered. This increases the time that the more critical components can be powered by UPS.

More particularly, FIG. 9 shows a flow diagram of how a dual-stage UPS can operate within a luminaire 111. By default, the luminaire 111 is powered by power supply mains via the AC to DC power supply. If the building experiences a power cut, step 141, the luminaire 111 can no longer be powered by the power supply mains, and must instead be powered by the UPS operating in a first stage mode, step 142. While the luminaire 111 is powered by the first stage UPS, the luminaire 111 can continue to provide all the functionalities as described above, including functionalities provided by the lighting module 20, communications module 22, motion detector 23, Bluetooth beacon 24, gateway router 25 and controller 26. Preferably, the first stage UPS 21a may be configured to provide power for a duration of time that is longer than the power cut duration for supporting the full functionalities of the luminaire 111, including power backup for internet connection. However, unless the mains power supply is restored to the building, step 143, the UPS may eventually run low on power, step 144. In this instance, the UPS can switch operation from the first stage (mode) of operation to a second stage (mode) of operation, step 145. When the UPS is operating on its final stage of operation (in this example, it will be the second stage of operation), the controller 3 restricts the supply of power to a subset of functions which are deemed to consume minimal amounts of power. For example, the controller 3 may simply restrict the supply of power to just the communications module 22. Or more generally, the UPS operating in the second stage 21C becomes the power supplier for motion detector 23, Bluetooth beacon 24, and controller 26 for maintaining communications detection/location functionalities inside the mesh network so that the motion detector 23, BLE beacon transceivers/transmitters 24 and the controller 26 remain active so that the communicating/detecting/locating capabilities of the luminaire 111 remain operational. The second stage UPS, which may support such communications detection/location functionalities on low energy consumption over a long period of time, provides power for a longer time. Once the mains power supply is restored, step 146, the luminaire 111 can draw power from the mains power supply.

A skilled person will recognise that the luminaire 111 may be powered with three or more stages of UPS provided by of one or more UPS. A skilled person will also recognise that there are other ways of controlling and/or restricting the supply of power to the various components 2-7 within the luminaire 111.

In summary, the dual stage UPS method of control in FIG. 9 can in one example do the following: In the first mode, the UPS (uninterruptible power supply) provides power to: at least one lighting module 20, at least one communications component (module) 22, at least one persons detection and/or positioning component, such as a motion detector 23, a Bluetooth beacon 24, a gateway router 25, the controller 26; and in the second mode, the UPS (uninterruptible power supply) provides power to: at least one persons detection and/or positioning component, such as a motion detector 23, the Bluetooth beacon 24, the controller 26; and wherein the UPS (uninterruptible power supply) is configured to switch from operating in the first mode to the second mode when power is running out. Preferably, the controller 26 is configured to be powered by the UPS at all times.

Figure 10:
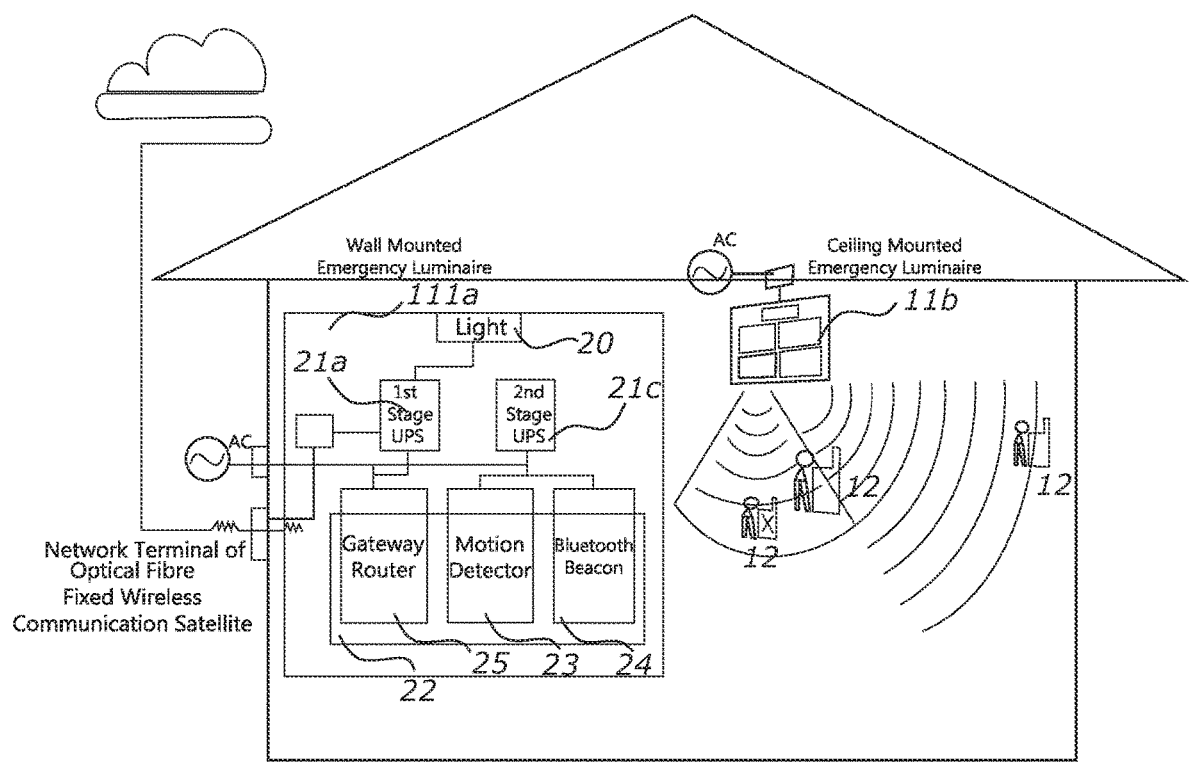
FIG. 10 shows in block diagrammatic form the dual stage UPS luminaire embodiment may be installed as a wall mounted luminaire as well as a ceiling mounted luminaire.

FIG. 10 shows in block diagrammatic form how the dual stage UPS luminaire 111 might be installed—a wall mounter emergency luminaire 11A and a ceiling mounted emergency luminaire 11B as described herein. This provides a luminaire network of nodes, for detection, position/location of persons and their mobile devices using modified and reconfigured emergency luminaires 111. Two such luminaire devices of 111a and 111b are shown by way of example, but it will be appreciated that any suitable number of emergency luminaire devices 111 could be provided to adequately provide coverage and functionality to the building in which the network is installed. In addition to the wall mounted emergency luminaire 111a, other designs of emergency luminaires (also configured with communication and location functionality but packaged in a different form) 111 may also be envisioned. For example, two ceiling mounted luminaires 111b can be provided, along with an emergency exit sign luminaire 111b in a corridor and a wall mounted version of the luminaire 111a anywhere in the building in propagation range.

Each luminaire 11 can be mounted in a suitable location, such as on a wall and or ceiling as disclosed in FIG. 1, wherein, one or more of 111a can be fitted on the wall at appropriate height that is reachable by a person such as above the floor at 2 meters at predetermined locations of exit and entrance points, fire access, stairways, corridors, passages and other confined space/room, such as private home, building manager's office in a building; while on the other hand, the ceiling mounted emergency luminaire 111b may be installed in place of conventional emergency lighting and light units (which are there specifically for meeting legal emergency lighting and light requirements under jurisdictions of any countries).

Figure 11:
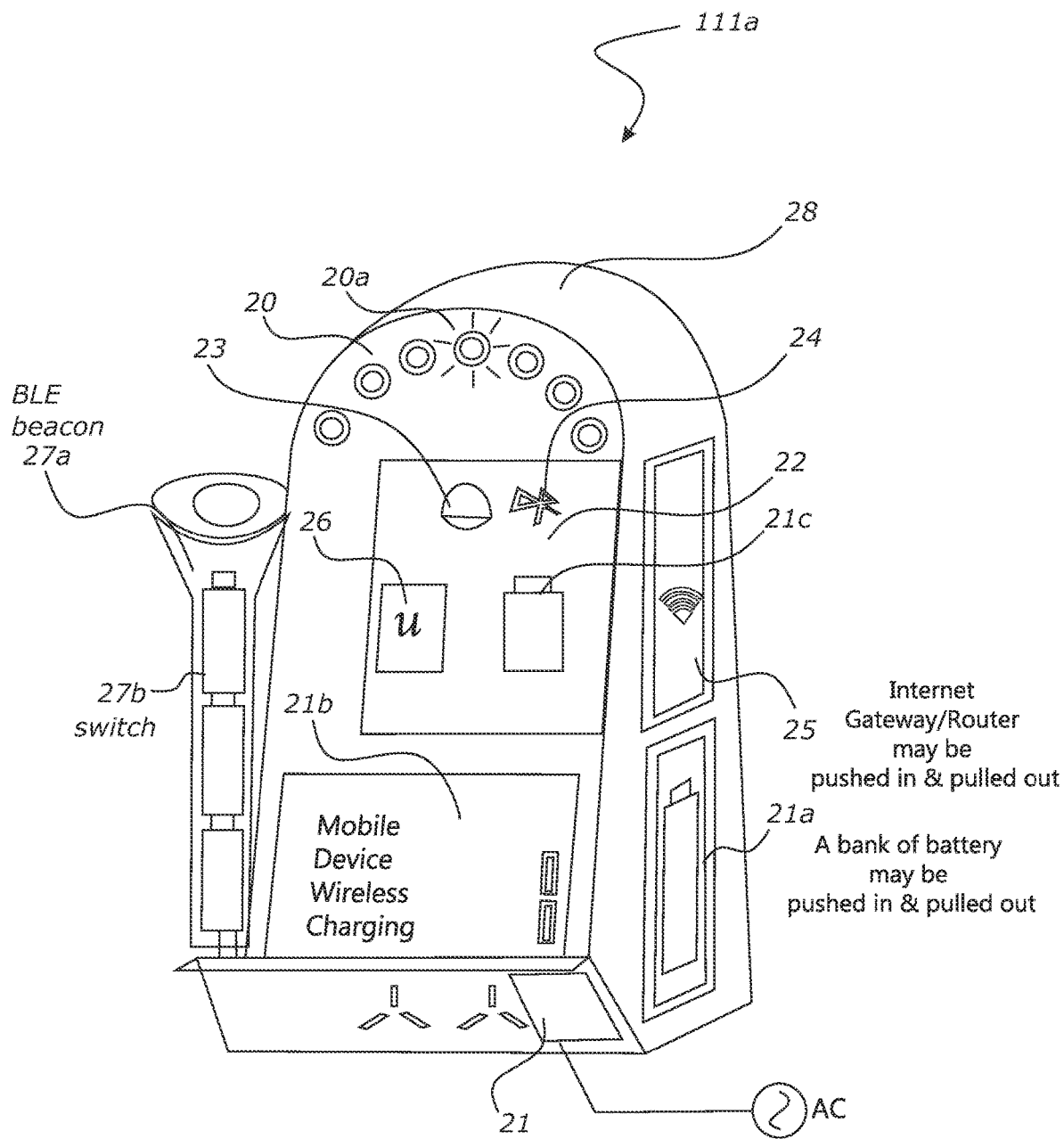
FIG. 11 shows an exemplary ceiling mounted dual stage UPS luminaire embodiment.

FIG. 11 shows one possible physical form of a wall mounted luminaire 111a as described above with reference to FIGS. 8 and 9. It comprises a housing with a round shape top and box shape bottom body, an RF in-house/wireless router which is removable and can be fitted within the body, a torch adapted to be attached to the outside of the body, various charging and power ports, and a diagonal backward face with mould bar stopper to facilitate wireless charging for mobile devices. It comprises a housing 28. A controller 26 is provided to control the components and overall functionality of the luminaire 111a, which comprises an mains power supply 21, which in this case is an uninterruptible power supply, in the form of a bank battery. The luminaire 111a may also have an inductive wireless charging unit 21B for charging the UPS, peripheral components, or external devices such as mobile telephones from the UPS. The luminaire 111a has lighting module of 20 and 20A, in the form of light emitting diodes (LED), which are powered from the mains power supply 21. The luminaire 111a may also have appropriate lamp shading. The luminaire 111a can contain circuitry that triggers/activates the luminaire 111 when there is an event, such as an emergency, wherein the lights will be activated and illuminate. For example, luminaire 111a might be triggered when the mains power/AC power supply is cut. Alternative forms of triggers could be utilised to provide a warning signal 20A across all the emergency luminaires in the local emergency luminaire network in a localised area such as of a floor level for example. For example, the luminaire 111a may be triggered through mobile device in proximity, i.e. a mobile smart phone could activate the luminaire 111a to illuminate, and carry out the communications, detection and/or positioning functions and issue an emergency alert.

The communications component 22 comprises one or more communications components of mobile device detection and/or position module being one or more of: a Wi-Fi and/or Bluetooth transceiver and/or beacon transmitter that has internet protocol connectivity, such as IPV6, an internet connectivity gateway, and/or a removable modem router/RF signal enhancer using IEEE 802.11 networking standards. The Bluetooth transceiver and/or beacon transmitter may be integrated in the above-mentioned detection and/or position module; and/or coupled to the UPS individually using Universal Serial Bus (USB) protocols; or may be an individual unit that can be detachable from the luminaire 111a, such as a button cell battery. The parameters of the Bluetooth transceiver and/or beacon transmitter may contain information about the physical location of the building the luminaire 111a is located in including: physical address as per public information data system, and horizontal and vertical position information of the emergency luminary apparatus deployed in the building. This information can be crucial for enabling the rescuer to trace the building occupant's whereabouts, especially during power outages when such information is predominately acquired by GPS and WiFi pinging an access point IP address, but could be disrupted by power cuts.

The luminaire 111a can detect the presence of one or more persons, for example through motion, proximity and/or object sensor (e.g. using IR motion sensor, heat sensor or similar) 23 to detect persons who may not necessarily have a working mobile device on their person.

The Bluetooth low energy transceiver/transmitter 24, powered by the multi stage UPS, is provided to facilitate communications between the luminaire 111a and the person's mobile device to communicate with third parties in and/or outside the building. The luminaire 111a can acquire position/location data using BLE, WiFi, and or cellular technologies; and in conjunction with the mobile device's built-in proximity positioning sensors, such as GPS, WiFi, Bluetooth, initial sensor of gyroscope, earth magnet compass, or accelerator, the luminaire 111a can be adapted to facilitate indoor positioning inside a building.

The BLE radio signal strength data acquired from the BLE beacon can be used to map out position/location of mobile devices (which can be assumed to represent a person's location in the building). The RSSI (Received Signal Strength Indicator) as measured by a mobile device can be calibrated to provide an estimate of a mobile device location relative to a BLE beacon. For a mobile device to be positioned by Bluetooth beacons, such power calibration involves a process in which the alert mobile device actively scans and measures the signal strength output of the beacon transmitters in proximity. During scanning three radio signals, in conjunction with, trilateration (with kalman filtering and finger printing method) can enhance positioning accuracy. This involves an onboard or off board processor and/or an onsite/offsite server that can receive and process/calculate the radio signal strength indicator provided by the nearby mobile device to determine the position of the mobile device (and therefore the person carrying the mobile device) relative to the luminaire 111a. In particular, the radio signal (fingerprint) issued from all of the Bluetooth beacon transmitters in the building may be collected/recorded physically/manually during the instalment and deployment the luminaire 111a and system to form a data look up table which can be stored in the server. When a mobile device is in proximity of a BLE beacon, the positioning process described above can be initiated. The mobile device's MAC ID and Radio Signal Strength Indication (RSSI) fingerprint may be sent to the server to calculate its position based on data previously stored in the server. The process of collecting data may be done by subscriber mobile device, by a software tool kit, which is available from the server's application and may be installed in the user's mobile device, such as smart phone. Therefore, RSSI radio signal (fingerprint) data acquired by the BLE beacon transmitters in relation to the mobile device users may be retained in the server and updated as long as the mobile device remains in proximity to a BLE beacon.

Acquired data representing the position of a real person and/or a mobile device may initially be stored and processed in the peripheral components of the luminaire 111a. The acquired data may then be transmitted a central controller 26 of luminaire 111a assigned as the proxy master luminaire before it is sent to the system platform cloud server, in which the positioning data may be shared with third parties. Having a network of emergency luminaires 111a (with each luminaire 111a in the network configured with a gateway/modem router to facilitate personal communication and power backup) allows persons in the building to instigate online and/or offline communications with third parties (including emergency services, and Public Safety Answering Points in the US) even if the usual telecommunications systems (such as, optical fiber, fixed wireless, WiFi Internet, communication satellite, mobile telephony services and/or landline telephony services) are not functioning because of power outage. The communications power backup functionality enables persons stranded in power outages in the building to send alerts, text messages, voice/video messages, or any other data or communications to those third parties, by using a personal mobile communications device such as a mobile telephone for example. This enables them to obtain assistance, indicate their whereabouts and existence, and generally exchange information with those in the outside world during an abnormal event/emergency.

The luminaire 111a also has a Wi-Fi communications circuitry (e.g. Wi-Fi access modem and/or router) 25 (forming part of a communications module 22), and power by the UPS. It can communicate with a person's mobile telephone or other mobile device in proximity. The Wi-Fi router is coupled to an ISP gateway connected with the wire and/or wireless network terminal, such as optical fiber, fixed Wireless, satellite communication at the premises to provide a means for communication by internet protocol communications to relay communications from a person's mobile communications device via the luminaire network to an outside party. The ISP gateway could be in the luminaire 111a itself (router and/or modem), or alternatively, could be external and connected to the luminaire 111a, in the case of a network terminal and modem 25 (the network terminal and modem may also have a RF signal enhancer functionality such as WiFi mesh, to improve communications signals. Such WiFi access point can also facilitate indoor positioning similarly to the Bluetooth transceiver/transmitters functionalities configured to the luminaire 111a as described above.

In addition to the emergency lighting, power backup & communications and positioning functionalities, the luminaire 111a can optionally be configured or adapted to comprise one or more of the following.

The luminaire 111a can have a UPS backup power socket 21b for supplying power from the AC power supply 21, and/or for an uninterruptible supply of power 21a to the nearest network interface device (internet network terminal such as optical fiber network terminal) and external access point/router/gateway of either optical fiber, fixed Wireless and/or satellite communication in normal time and in power outage as well. The luminaire 111a provides power supply to the communication network terminal of the ISP (internet Service Provider) by connecting the network interface device to its UPS socket. This way, the device can function as normal in a black out in a reasonable time frame, so as to supply an uninterruptible power source in a power-cut to secure the Internet and Wi-Fi service access for the local area network. The socket 21b can also be used to power other external devices, such as those carried by occupants who may be stranded in the building and may want to recharge their mobile device to communicate with others within and/or outside of the building; and more importantly, to disclose their indoor position. The emergency luminaire 111a can also supply UPS power backup to the Wi-Fi modem/router for a reasonable length of time under the multi-mode power supply by at least two stages as disclosed in FIGS. 3a & 3b.

The luminaire 111a can have a USB power charging socket on 21b for charging devices, such as mobile communications devices (e.g. mobile telephone). It can also have a wireless charging holder for a mobile communications device. There can be an AC power supply for supplying normal A/C powered appliances or other devices.

The luminaire 111a can have an AC power supply 21 for the luminaire 11a itself, which can be hardwired to the mains power supply, or connected via a typical power plug.

The luminaire 111a can also have a mobile electronic device holder for receiving and/or charging mobile devices, either through the power socket or via inductive charging; from 21b in connection with the UPS 21a or from the mains supply 21 accessible by the luminaire 111a.

A removable modem/router unit with RF signal enhancer 25 as disclosed above by may also have RF signal enhancer functionality such as WiFi mesh, to improve communications signals. The removable modem/router can be extracted by a person and taken with him to improve/extend coverage and communications from their mobile communications device to the luminaire 111a or to other communications networks.

Similarly, a set of detachable power bank coupled to the UPS battery 21a can be extracted by a person and taken with him for extra convenient use of power backup with mobile electronic devices such as smart phone, laptop, wearable device and etc.

An emergency torch 27 can be coupled to the luminaire 111a, which can be charged from the UPS 21a. A BLE beacon transmitter 27a may be embedded inside the torch, in which the chargeable battery of the torch can provide stable power supply to the BLE transmitter. In a power outage, persons in a building can use the emergency torch that is readily on stand-by with full chargeable battery level. The torch 27 upon flicking a switch 27b, can illuminate, but also can trigger an emergency alert, wherein, the embedded BLE transmitter can communicate with the luminaire 111a proximate to the person to report position and movement by BLE radio wave, in a similar manner to how the movement of a mobile device can be traced.

Not all components described necessarily need be provided, and a subset of them may exist only.

Figure 12:
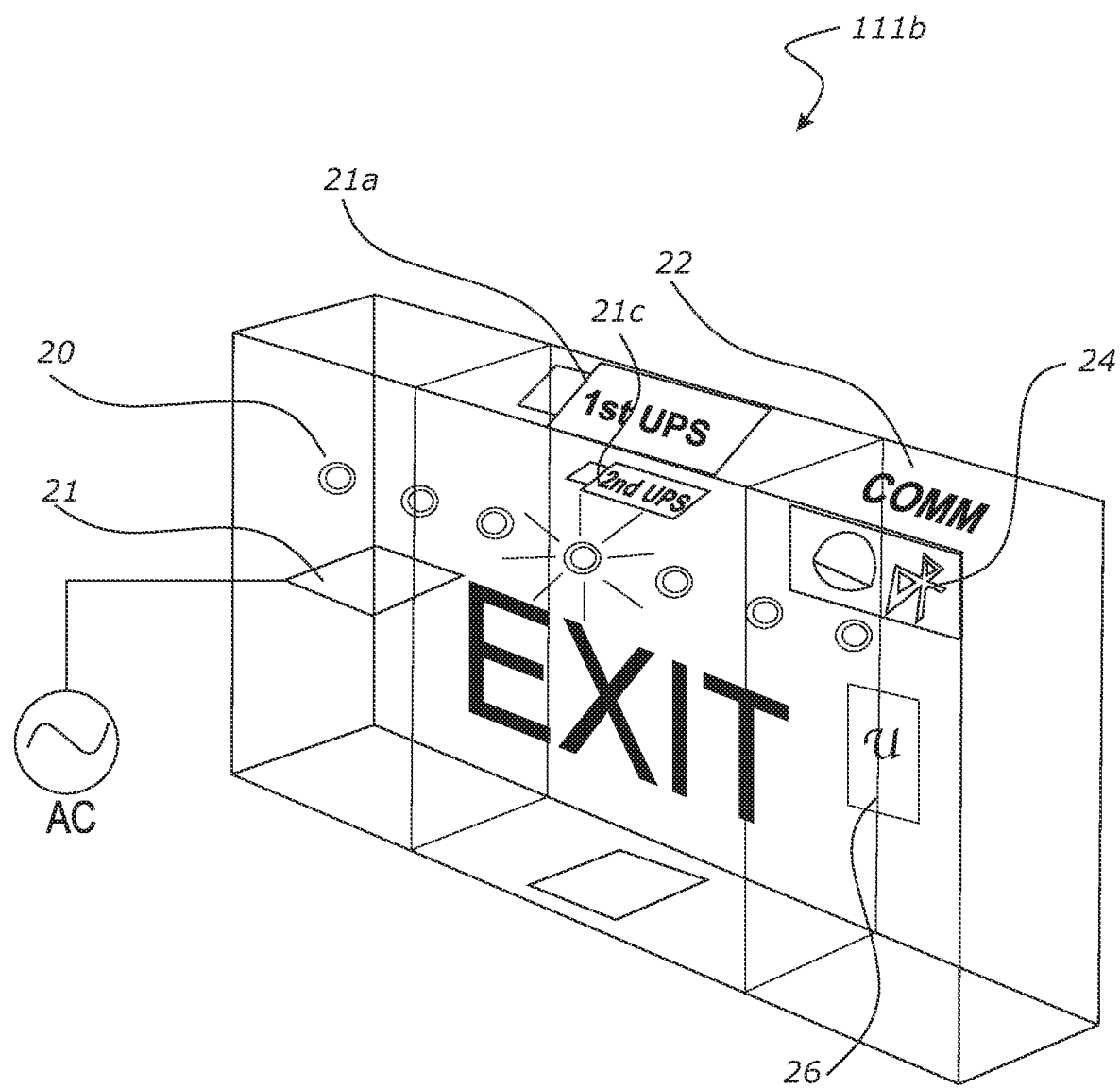
FIG. 12 shows an exemplary exit sign dual stage UPS luminaire embodiment.

FIG. 12 shows another possible physical embodiment the emergency luminaire 111b. This is a ceiling or wall mounted sign luminaire 111b and it may be ceiling or wall mounted in common areas, such as fire escape exit route, stairway for emergency evacuation; and also in hallway, lobby, mezzanine and other places in the building where occupants are likely to be. The emergency luminaire 111b may be installed on private premises, and/or as well for being used as normal emergency light in response to power cuts for facilitating provision of assistance in an event.

Many jurisdictions set mandatory distance visuality, (such as 24 meters visuality for example) for providing minimum emergency lighting for evacuation. Often in narrow spaces (such as corridor, escape route, stairway), there may not be enough of nodes for trilateral positioning (trilateral positioning requires at least three radio points and will not be possible in situations where there may not be three nodes provided). This situation is common in many buildings, with deployment of the luminaire 111 and/or joined provisioned nodes of other emergency facilities is fewer than three in proximity. Further it may not be possible to use BLE trilateration to estimate person's location because, the person may not have a working mobile device in their possession, such as mobile 112b for example. It is also preferable that the motion sensor 23 can capture the positions of all building occupants in a building. This is useful for reporting the total number of persons in a building.

Figure 24:
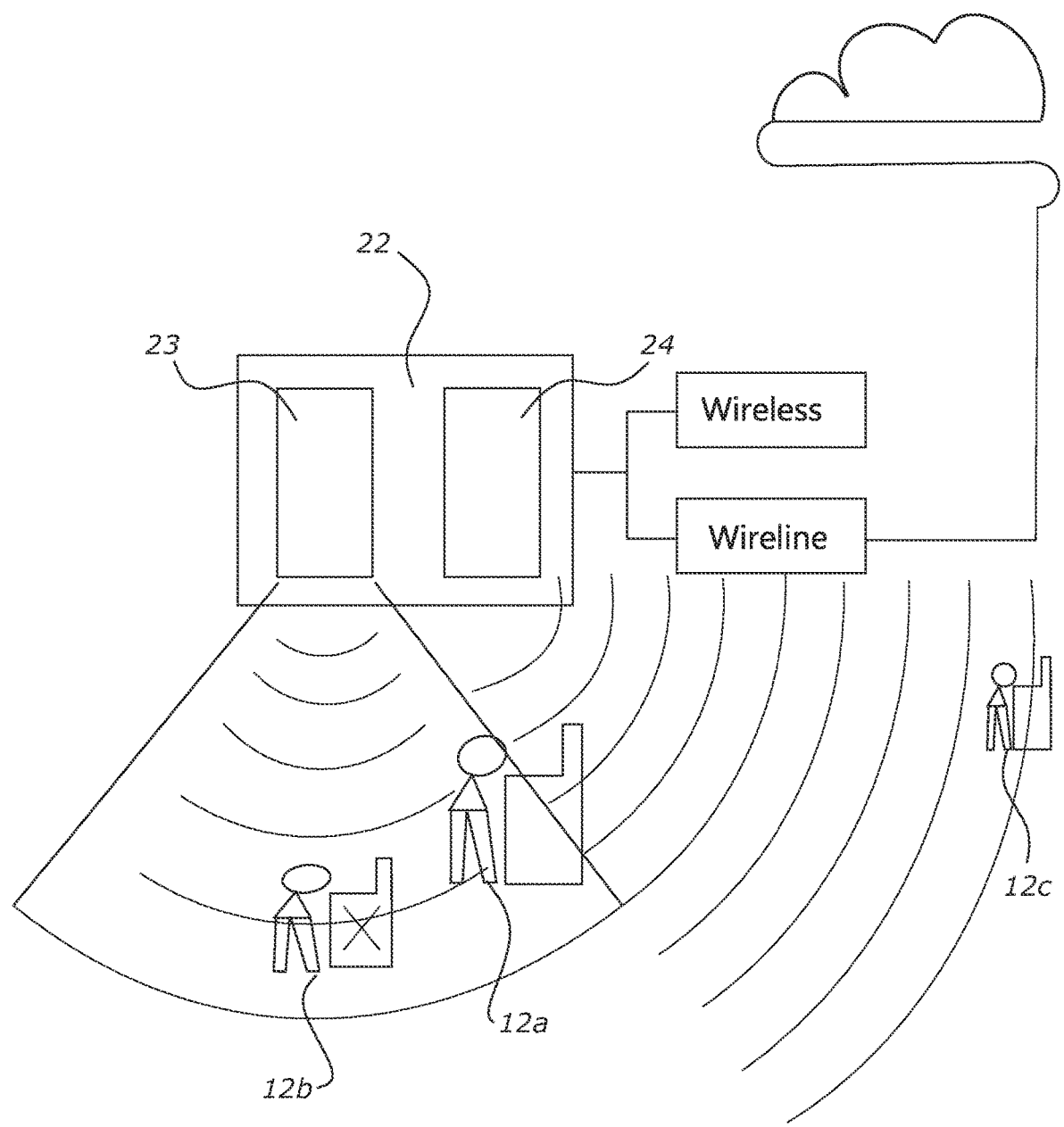
FIG. 24 shows how a luminaire can employ a dual-mode method of detecting building occupants.
Figure 25:
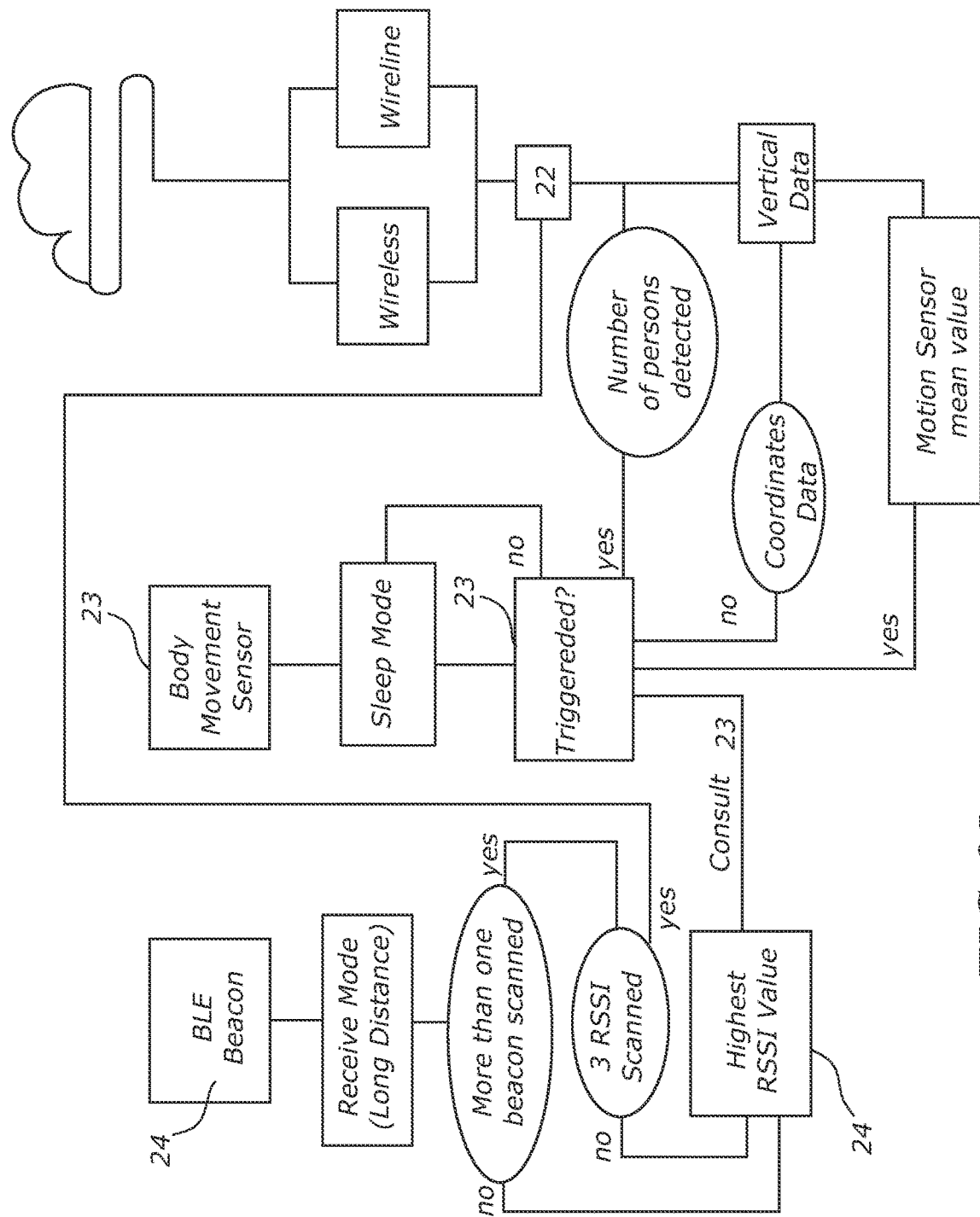
FIG. 25 is a flow diagram of how a luminaire can employ a dual-mode method of detecting building occupants.

FIGS. 24 and 25 shows in diagrammatic block form and function operational flowchart of an example of a luminaire 111 used in power outages and event evacuation, configured with a dual-mode method of detecting/locating the position of building occupants based on radio signal and body movement persons. The BLE beacon can be used to track the location of a mobile device, and the motion sensor 23 can be used to track the location of a building occupant in possession of the said mobile device. Combining these two functions together can help improve the location accuracy of the building occupant. FIGS. 4 and 4A show an exemplary operational embodiment and a flowchart of an example of a dual-mode positioning system configured in a luminaire 111 which may be used during a power outage or during evacuation, wherein, the luminaire 111 is integrated with BLE beacon transceiver and/or transmitter 24, and motion (body movement) sensor (e.g. PIR motion sensor, heat sensor or similar) 23. The luminaire 111 may optionally connect to other nodes of emergency equipment such as fire alarm, smoke detector, fire sprinklers that use the same communication standard, such as IEEE 802.15. The luminaire 111 may in some situations be deployed in a position that makes it difficult to be scanned by user's mobile device (as the luminaire 111 may be placed in a poor orientation, such as being mounted on the ceiling above a narrow space such as a corridor, escape route, stairway) where trilateral positioning that requires at least 3 nodes may not be possible. In this type of situation, trilateration may not be possible because the RSSI value that represents directional distance in between the BLE beacon and the persons mobile device may not always be accurate and reliable, and/or RSSI scanning by mobile device may fail. If it is not possible to use trilateration to estimate a building occupant's position then the measurements taken by motion sensors 23 may be used to capture presence of persons 12*a* in short distance in such narrow space.

The power setting of BLE beacon transmitter 24 is set to transmit at relatively long distance, enabling its intermittent radio wave transmission to cover the whole building both vertically and horizontally, when building occupants 12*a* and 12*c* of mobile devices on 2 persons are detected on the scanning by these two mobile devices, of which scanned RSSI value by 12*a* is much greater than such of 12*c*, indicating mobile device 12*a* closer to beacon transceiver and/or transmitter 24 than mobile device 12*c*. The person in possession of mobile device 12*b* (but is not using their mobile device) may be captured by motion sensor 23.

FIG. 25 discloses a programming flowchart showing how the a dual-mode positioning method may be used in situations, when trilateral positioning is not possible. The BLE transceiver/transmitter 24 may be set for long distance detection based on maximum power of the best propagation range setting. In conjunction, the PIR motion detection may be also in use for short range detection for any presence of persons. If the mobile device position is determined to be close to the position of a building occupant, it can be inferred that the building occupant in possession of the mobile device. In this instance, the highest RSSI value (this value scanned by person's mobile device) can be cross-referenced against the measurements picked up by the motion sensor 23 as a double confirmation of the presence of persons on mobile devices. This may be done by obtaining an estimated position of the mobile device based on the horizontal and vertical position of the BLE beacon that produced the highest RSSI value. The horizontal position of the BLE beacon can be obtained by extracting the latitudinal and longitudinal coordinates of the BLE beacon 24. Optionally, the mobile device's RSSI (which is a value representative of distance between the BLE beacon and the mobile device) may be compared against the mean distance of the person from the motion detector. The vertical position of the BLE beacon may be inferred based on the vertical height of physical floor level that the luminaire is located on (this value can be stored as a parameter of the BLE node 24).

If a person does not have a functional mobile device, they may be detected by the motion sensor 23 if they are in close range. The person's position may be determined in a similar way as how a person with a working mobile device may be detected. In addition, total number of persons in the building and their respective horizontal and vertical positions may be obtained in real time through communication components 22. This information may be transmitted by multi-hopping messaging means to send to the nearest gateway to send to the online cloud platform; and/or send (by offline application in the worst case scenarios) to emergency call dispatchers, first responders, rescuers, building managers and security officers, and/or other authorized third parties of interest.

Use of Luminaire

On the occurrence of an event, such as an emergency situation, the luminaires 111 in the system 12 will activate. The activation could be triggered, for example, based on there being a power cut to the regular AC power supply—thus providing the presumption that there is some sort of emergency and emergency lighting is required. Other triggers could be used, and it will be appreciated that the luminaire and system described is not necessarily restricted to being used just in emergency events. It could be used in any event, or even during normal circumstances, where required. In this case the UPS of the luminaires will power each device and the network. It can power the associated network terminals and network access point (external router) and also any external mobile or portable devices, such as smart phones, computers etc. The controller 24 of each luminaire will trigger/activate the lighting module to provide lighting. In addition, the uninterruptible power supply will power the communications module(s) and/or the detection/positioning module(s) and/or any other components of the luminaire. The controller then can facilitate communications, persons detection and/or persons positioning. For example, if a person 11*a* in the building requires to communicate with a third party, they can use their mobile phone to communicate via the Wi-Fi router, Bluetooth transceiver or any other means, to an outside party via a computer network, telephony network or similar. Likewise, the party can communicate in wards to the person 11*a*. The system can also detect the presence of one or more persons 11*a*, for example through motion, proximity and/or object sensor (e.g. IR motion sensor, heat sensor or similar). This information can be communicated via the communications module and network/system to a server/third party, such as emergency services 15. Likewise, using triangulation or otherwise, the Beacon, Wi-Fi, Bluetooth and/or other detectors can be used alone or in combination with various luminaires to determine the position of a person 11*a* in the building. This position can then be communicated via the communications module to a third party, such as emergency services 15, to assist with rescue or to provide other assistance.

Using the various communications and/or power ports, a person 11*a* can charge their mobile communications device or other apparatus using the luminaire. Likewise, a person 11*a* can use the emergency torch, which activates and lights up upon trigger of the event. Direct communications can also be made to a luminaire via for example the USB or other data port.

The modified luminaire and system is disclosed exploits the fact that there is an emergency lighting infrastructure provided on a building, and builds on this to provide additional functionalities without requiring separate communications and detection infrastructure. Some exemplary use case scenarios will now be described.

Figure 13:
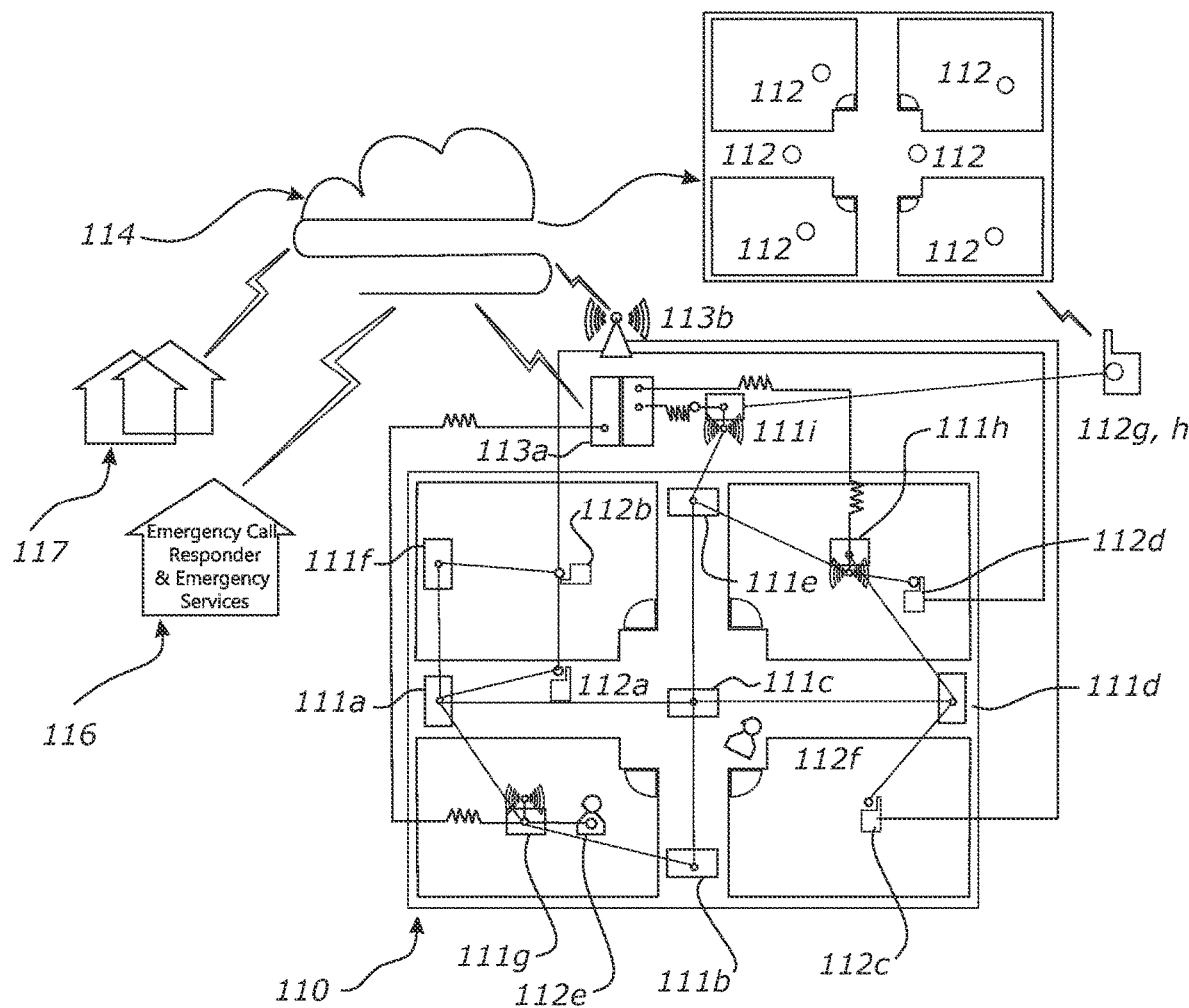
FIG. 13 shows a plan overview of one exemplary use case scenario.

FIG. 13 shows a plan overview of luminaires 111 operating together as part of a network. A network of luminaires 111 are dispersed throughout the building 110. Installing multiple luminaires 111 throughout the building allows building occupants 112 to call for assistance from any position in the building 110. In addition, it is possible to trace the location of building occupants 112 within a building 110 and even trace the movement of building occupants 112. Such data can be collected and then relayed over an external network (online server 114 for example) to emergency services 116, to a security monitoring service 115, or to any other third party 117.

In particular, FIG. 13 shows, the floor plan of a building 110 level with a system/local area network comprising a network of luminaire 111 in general block diagram form configured as described herein to provide communications, person detection and/or person location/positioning functionalities for locating presence of persons on a building and/or power backup. A plurality of luminaires are deployed in common areas. The luminaires 111 are further configured with power backup for either an external and/or internally detachable internet communication access point, such as home gateway router. The luminaires are also configured to provide an internet network connection terminal device (which might be an optic network terminal (ONT) that connects to a fiber optic network), and fixed wireless, or communication satellite for internet service. Luminaires 111g, 111h, 111i may serve as a gateway that converts information data collected within the local area network to provide an online connection. In particular, luminaire 111i may be (desirably always) located on outside of the building, such as at the entrance and/or the building manager's premises, and/or any other space inside building where an online internet network connection terminal is warranted. Luminaire 111i also has a power backup for supporting the functionalities described above and for supporting the online connectivity of external mobile devices, such as WiFi and power back up of external mobile devices. It is desirable to install luminaire 111i outside of the building, as this allows emergency first responders to access real time information on site.

Exemplary scenarios of how the network operates will now be discussed with reference to FIGS. 14 to 23. These scenarios refer to building occupants and their mobile devices, which will now be described as follows:

Person 112 is in possession of a mobile device 112a that is out of mobile cellular data and therefore does not have an internet connection;

Mobile devices 112b and 112c have an active cellular internet connection;

Mobile device 112d can go online because it has an active cellular internet connection, or because it has a wireless internet connection supported by the luminaire 111;

Person 112e has a wearable device that can communicate with a luminaire 111 to issue an alert;

Person 112f refers to any person who is not equipped with a working mobile electronic device. In this case, person 112f may have a mobile device with a flat battery, or person 112f may not have a mobile device on their person at all. All these people may be detected and positioned by the network of luminaires 111 installed throughout the building.

Mobile devices 112g and 112h are used by building managers, security officers, and emergency first responders for online communication, and/or for offline tracing of people inside the building by only connecting the nearest node 111i of the mesh network in power outages where internet connectivity may not be available.

FIGS. 14 to 23 also refers to internet communication access 113, which is the internet infrastructure network connection infrastructure outside of the building. The internet communication access 113 may comprise:

Internet network connection 113a is a distribution panel of nodes comprising one or more of: optical fiber wire, fixed wireless, or communication satellite for internet service; and Cellular site 113b that is within reception range of the building.

Cloud server 114 is the hosting platform, that stores data relating to the real-time positions of building occupants. The cloud server 114 may be configured to supply third parties with a graphical representation of data 115.

Figure 14:
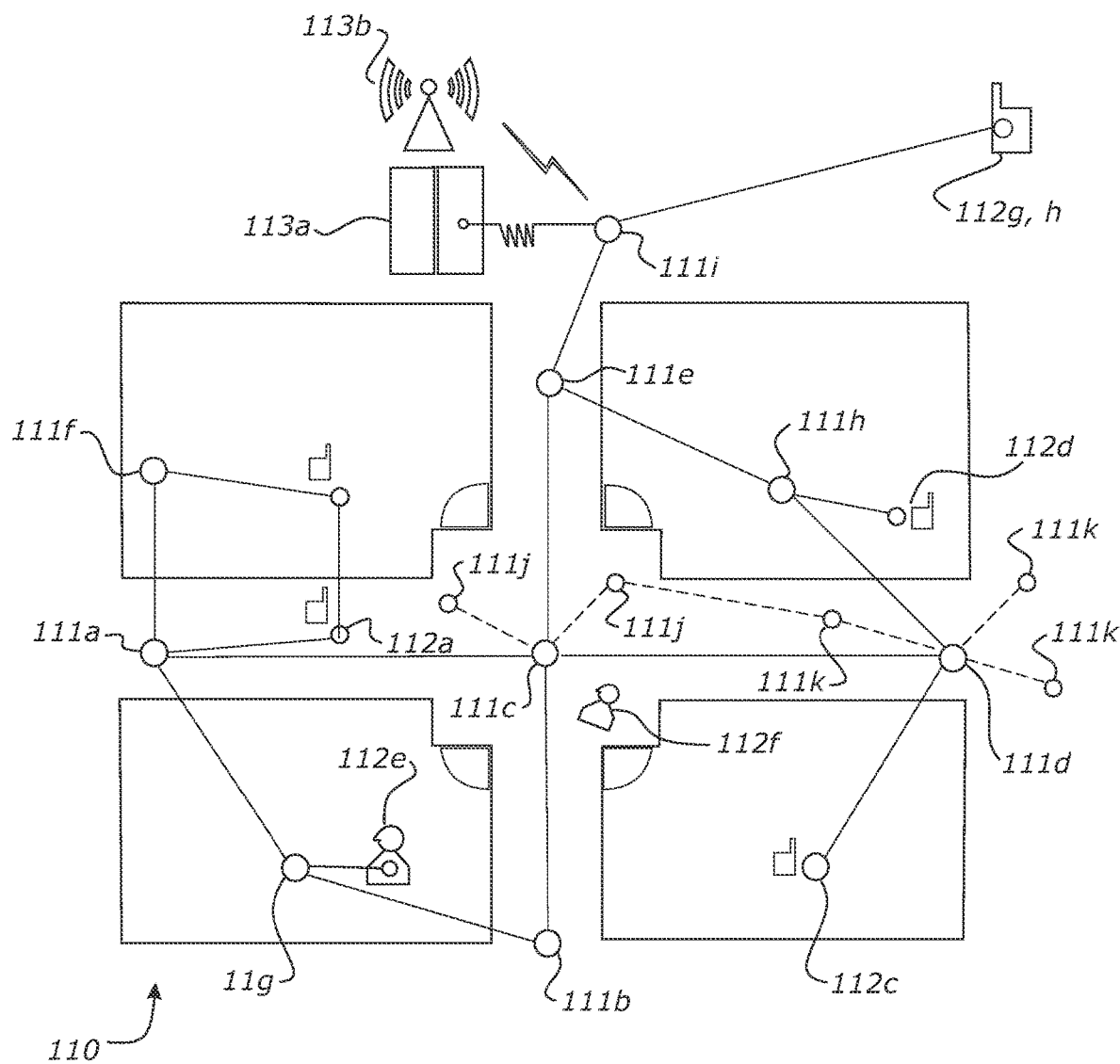
FIG. 14 shows another plan overview of one exemplary use case scenario.

FIG. 14 shows in diagrammatic form a building floor plan 10 experiencing a power outage, cutting out normal lighting and internet access facilities building. FIG. 14 shows a mesh network of luminaires 111a-i configured as network nodes on radio frequency, such as BLE. Luminaires 111a-i can be connected as part of a multi-hop mesh topology of an indoor wireless network. The network backbone infrastructure of nodes may include at least one internet connection node of 111i being a proxy and continent gateway that converts BLE to get online to connect with internet infrastructure network connection distribution facilities 113a-b. The luminaires 111a-i may be also connect to other provisioned nodes 111j, 111k, such as smoke detectors, fire alarm, fire sprinklers, lighting switch, thermostats and etc. The provisioned nodes 111j, 111k may be deployed in their proximity using the same mesh network communication protocols as the protocol used for detecting mobile devices. The mobile devices 112a-e may interact with any nodes in the mesh network in which the Bluetooth-mesh proxy protocols may be followed by any nodes. In situations where mobile & wearable devices that do not possess a Bluetooth-mesh stack to interact with the said mesh network, rescuers can still trace the position of a person's mobile and wearable device by communicating with the closest node 111i, and/or communicating with any joined and provisioned node that is near the rescuer's Bluetooth-mesh capable device. Even if the node that detected user's device is out of range, offline positioning of the user's mobile device by multi-hop messaging can be achieved by the use of a Bluetooth-mesh capable device 111l, 111m. Bluetooth-mesh capable devices 111l, m should preferably be used by rescuers, building managers, security officers, and emergency first responders to locate building occupants, even in the worst case scenarios, such as earthquakes, fire, and power outages.

Figure 15:
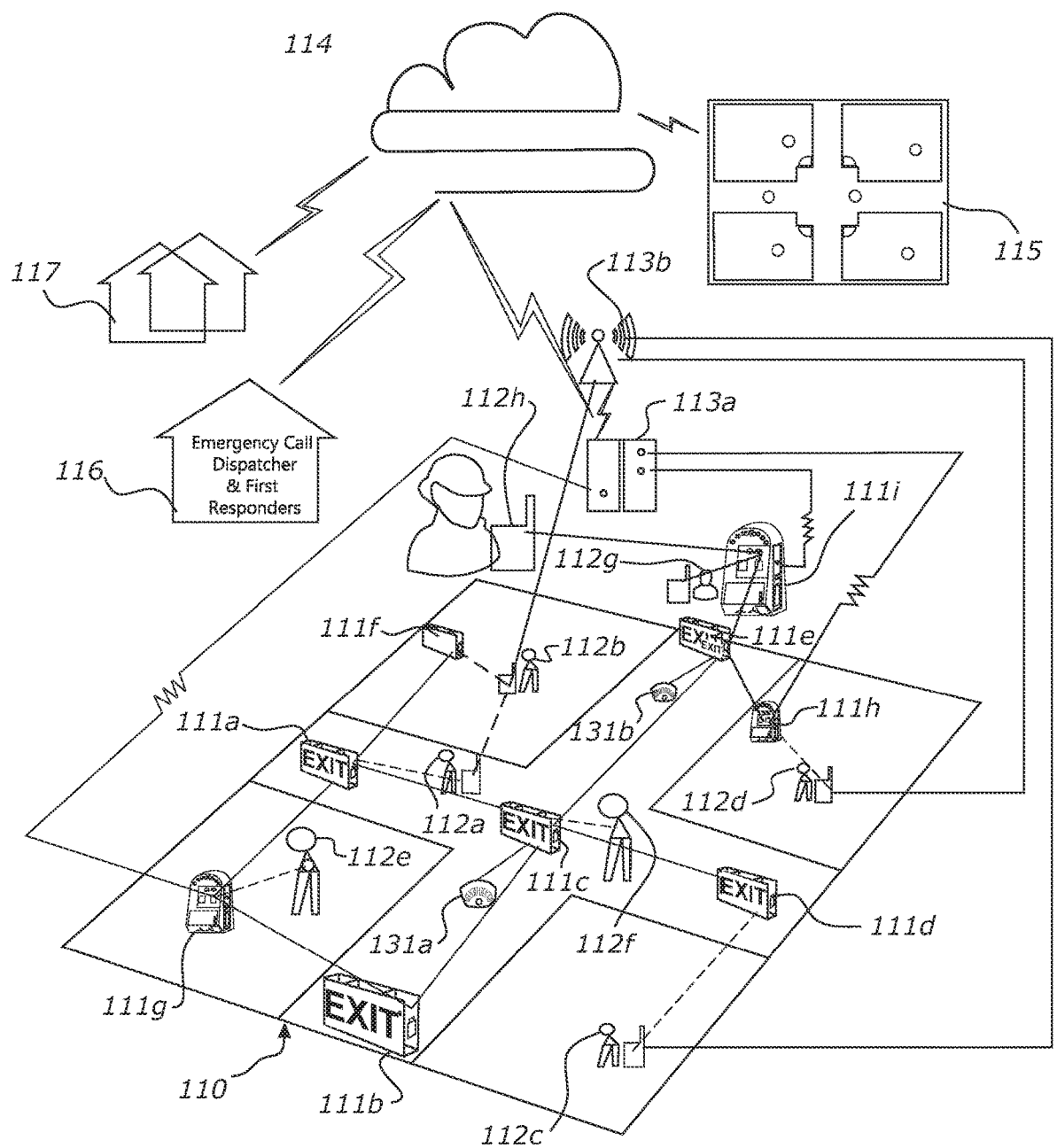
FIG. 15 shows another plan overview of one exemplary use case scenario.

FIG. 15 shows an exemplary scenario, of a local mesh network 111a-i that can communicate and interact with other emergency related devices, such as smoke alarms 131a, 131b by using the same networking protocols deployed on a floor level in a multi-level building. In this scenario, building occupants may issue alerts in different circumstances, wherein, all luminaires 111 may be configured with functions of internet connectivity such as IPV6 over BLE, with luminaires 111g-i specifically configured with an internet gateway and power backup to provide optical fiber and/or fixed wireless and communication satellite for internet service facilities 113a. Building occupants may use a variety of communication platforms to issue alerts from their mobile and/or wearable devises of 112 which may be traceable using mobile devices' built-in proximity sensors, including Bluetooth transceiver, GPS, WiFi, magnetometer, gyroscope, barometer and accelerometer etc. In the case of person 112f who does not have access to a working mobile device may be detected by the dual mode detection method.

In such invention emergency luminaire apparatus mesh network, when any occupants building using above mentioned mobile devices issues alerts, the owner of device 112g (used by the building manager, security officer, fire warden, or anyone responsible for patrolling the building) may share location data online. Real time information may be transferred online through luminaire 111i deployed in the building manager's premises and/or other space where Internet connection is warranted. This is so that all real-time data of detection, position/location of building occupants may be processed by an algorithm in the cloud server 114, including a mapping engine for displaying graphical representations a building occupant's location and/or movements. The information (as well its graphical representations) stored on the cloud server 114 may be shared with other third parties including emergency call dispatchers, and emergency services like fire, police and ambulance 116, and/or other authorized parties of interest 117. Therefore, luminaire 111i may be considered as the secured and continent online receiver and sender of data between the building and externally.

The exemplary scenario described above therefore describes how it is possible to locate persons in extreme conditions, regardless whether they have a mobile device in their possession. In such conditions where there is an absolute Internet communications blackout, the enabling rescuers, building manager, security officer, fire warden, and emergency first responders, firefighters can use device 112g, h with installed offline application program to locate any building occupants by connecting to any node in the mesh network on site and/or remotely.

Figure 16:
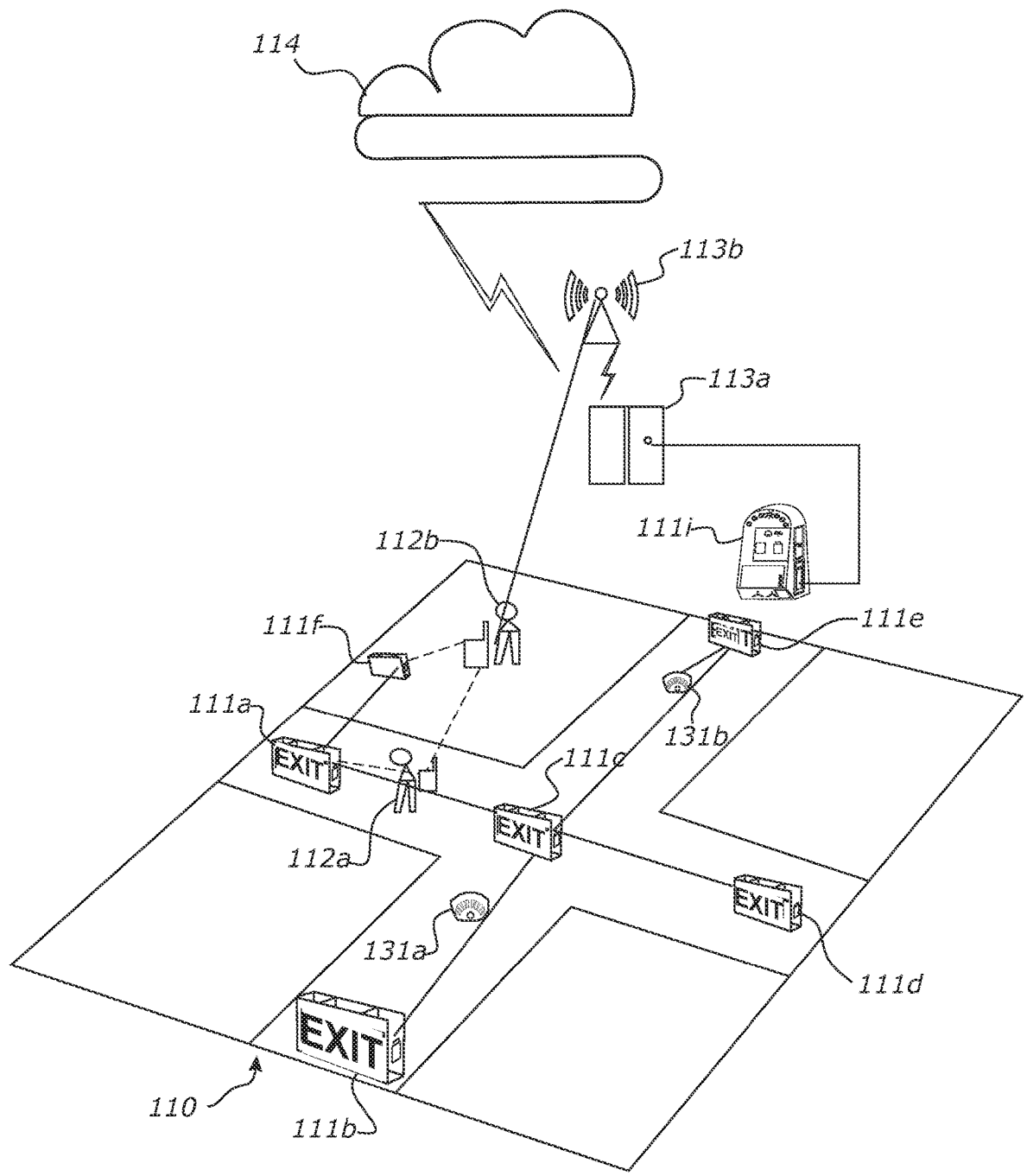
FIG. 16 shows another plan overview of one exemplary use case scenario.

FIG. 16 shows an exemplary scenario where the supply of power is cut to a building 110, but otherwise there is no emergency incident. In this situation, the main building lights are out, and the building wi-fi network is down. The building occupants do not need to evacuate in this scenario, because there is no emergency situation taking place. The building occupants simply need to stay put and wait until power to the building 110 is restored. In the meantime, the building occupants can use the network of luminaires 111 to communicate that they are safe. The building occupants can use their mobile devices 112a, b to connect to the wi-fi within the communications module 22 of an luminaire 111 and notify their friends and families that they are safe. In this situation, the building occupant can use WiFi Ad-Hoc messaging such as WiFi Direct (Brand) for issuing alert to a nearby mobile device 112b that has active online connectivity, such as cellular connection, and/or WiFi connection supported by the luminaire 111, so to contact emergency services 16 directly (the building occupant may use any form of digital multi-media such as text, photo, voice assistant, video and VoIP to call for help). Both the mobile devices and the person possessing the mobile device may be detected and located under the dual sensing method. The alert and position data can be relayed over the Internet cellular network; or by relaying the alert and position data across local mesh network (via multi hop messaging) to reach gateway luminaire 111i, which can then be relayed onwards to the online server 122.

Figure 17:
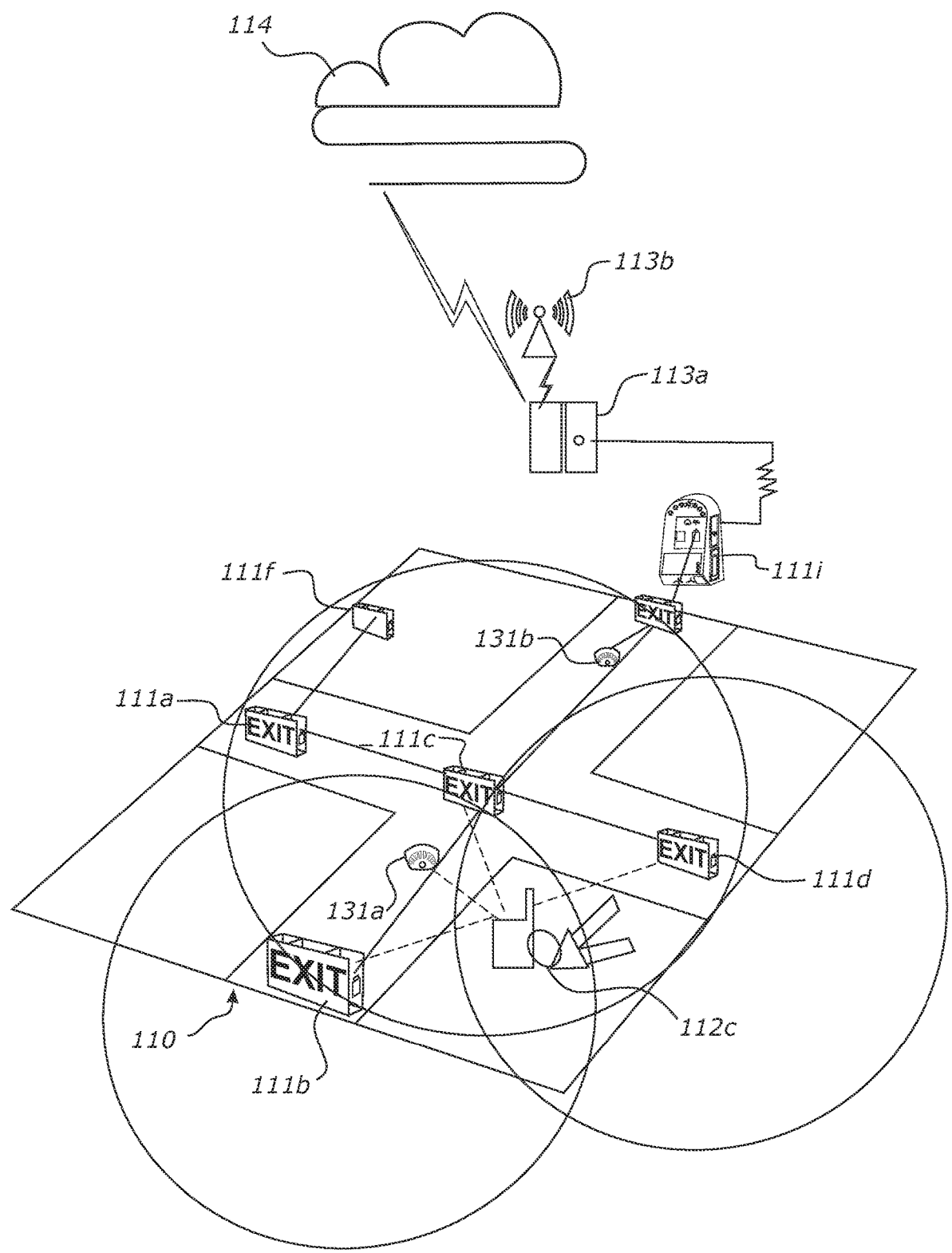
FIG. 17 shows another plan overview of one exemplary use case scenario.

FIG. 17 shows another exemplary scenario where a building occupant 63a accidentally falls over and is unable to get up, and requires medical attention. In this situation normal lighting and WiFi internet access facilities are down. The person has a mobile device 112c with an active cellular online connection to contact emergency services 16 directly (the building occupant may use any form of digital multi-media such as text, photo, voice assistant, video of VoIP to call for help). In addition, the mobile device position may be detected by BLE beacon transceiver/transmitter integrated in the luminaire 111b, 111c, or possibly by the smoke alarm 131a and/or luminaire 111d if it has a BLE beacon. The alert and position data can be relayed across local mesh network (via multi hop messaging) to reach gateway luminaire 111i, which can then be relayed onwards to the online server 122.

Figure 18:
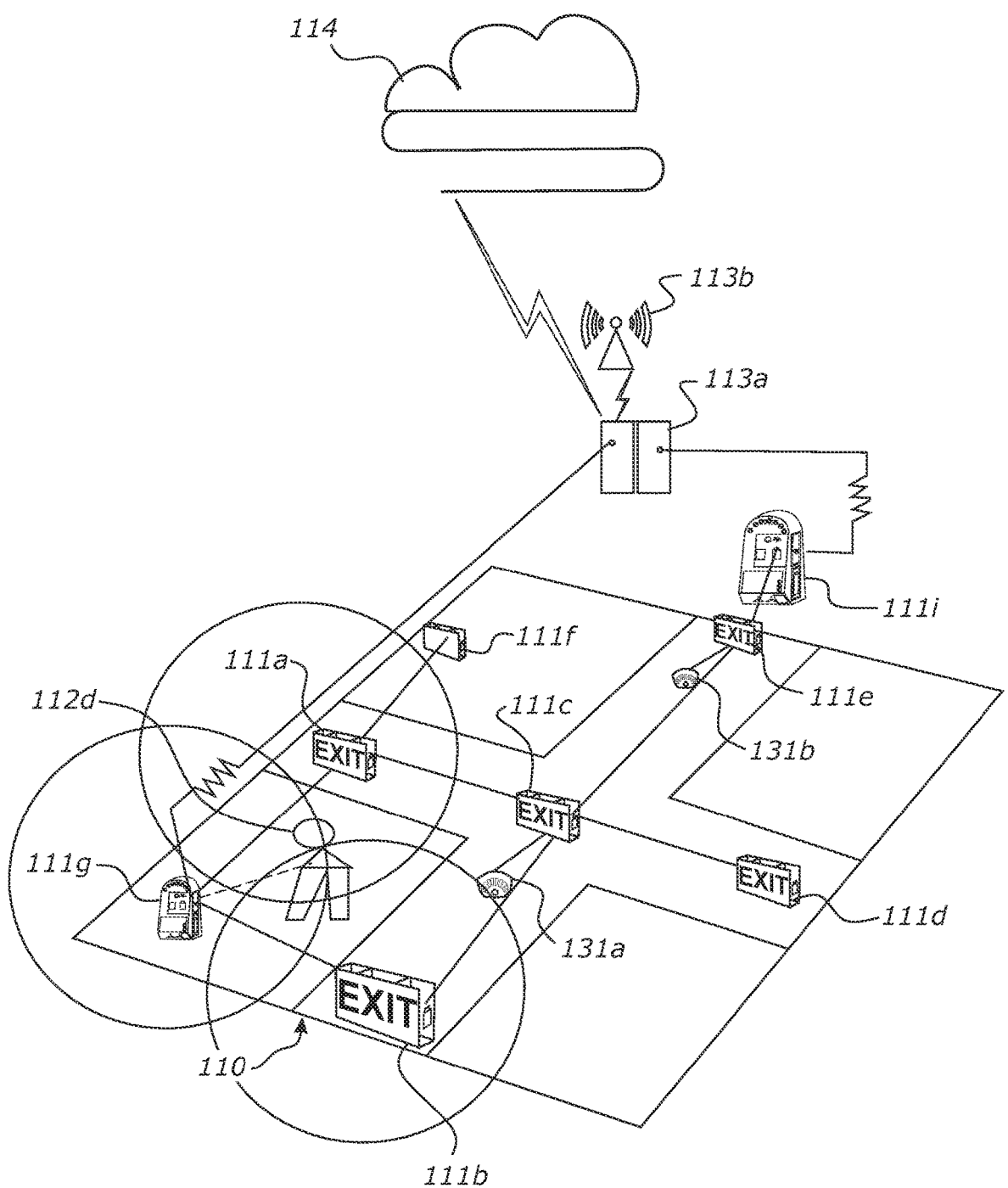
FIG. 18 shows another plan overview of one exemplary use case scenario.

FIG. 18 shows a similar exemplary scenario to FIG. 17, except in this scenario, the building occupant can call for medical assistance using a wearable device 112e to communicate. Under this exemplary scenario, the person's movement may be detected by the movement sensor integrated in luminaire 111g. However, in addition, the position wearable device 112e worn on the building occupant may be detected by BLE beacon transceiver/transmitter integrated in luminaires 111a, 111b, and 111g. The alert and position data can be relayed across local mesh network (via multi hop messaging) to reach gateway luminaire 111i, which can then be relayed onwards to the online server 122.

Figure 19:
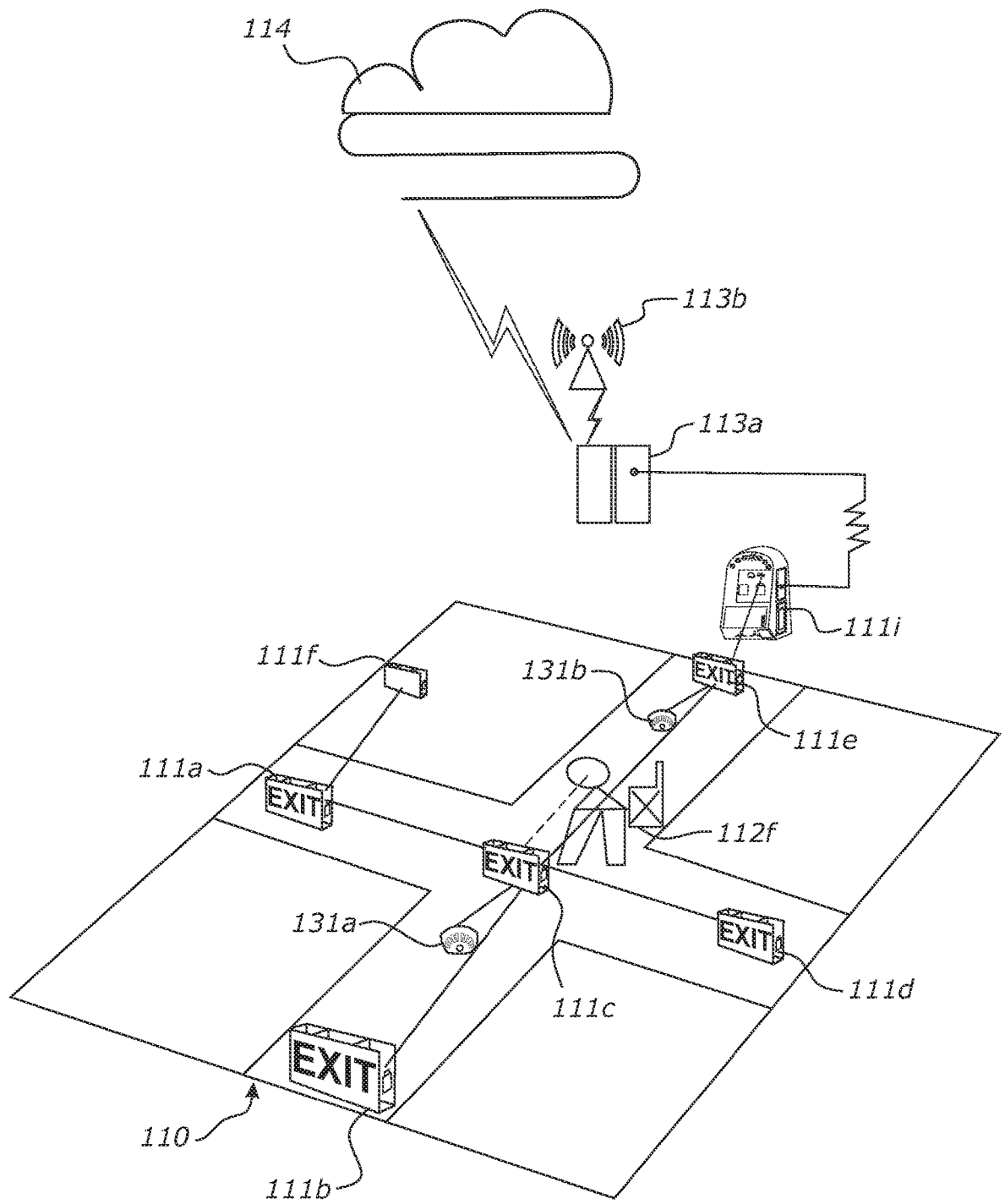
FIG. 19 shows another plan overview of one exemplary use case scenario.

FIG. 19 shows an exemplary scenario in which normal lighting and WiFi internet access facilities in the building are down. In this situation, the person with mobile device 112f does not have access to a working mobile device. However, the person's movements can be traced by the movement sensor integrated in the luminaire 111c. The alert and position data can be relayed across local mesh network (via multi hop messaging) to reach gateway luminaire 111i, which can then be relayed onwards to the online server 122.

Figure 20:
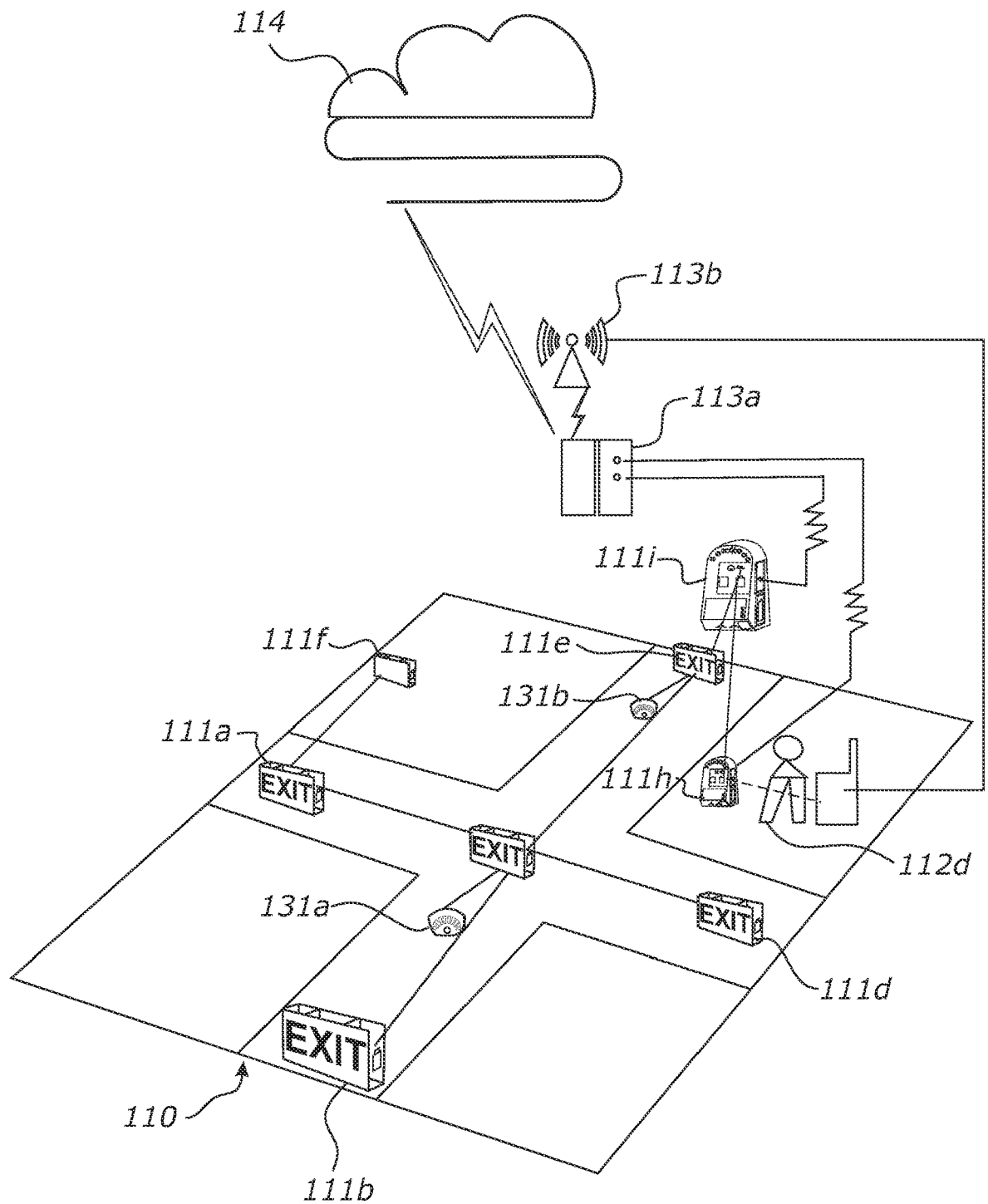
FIG. 20 shows another plan overview of one exemplary use case scenario.

FIG. 20 shows an exemplary scenario in which normal lighting and WiFi internet access facilities in the building are down. A person in possession of mobile device 112d, which has an active mobile cellular online connection can either use their mobile device to contact emergency services 16 directly (the building occupant may use any form of in digital multi-media such as text, photo, voice assistant, video and VoIP call for help). Alternatively, the mobile device may be operated to connect to the BLE and WiFi provided by the luminaire 111h in order to issue an alert to emergency services 16. Both the mobile devices and the person possessing the mobile device may be detected and located under the dual sensing method. The alert and position data can be relayed across local mesh network (via multi hop messaging) to reach gateway luminaire 111i, which can then be relayed onwards to the online server 122.

Figure 21:
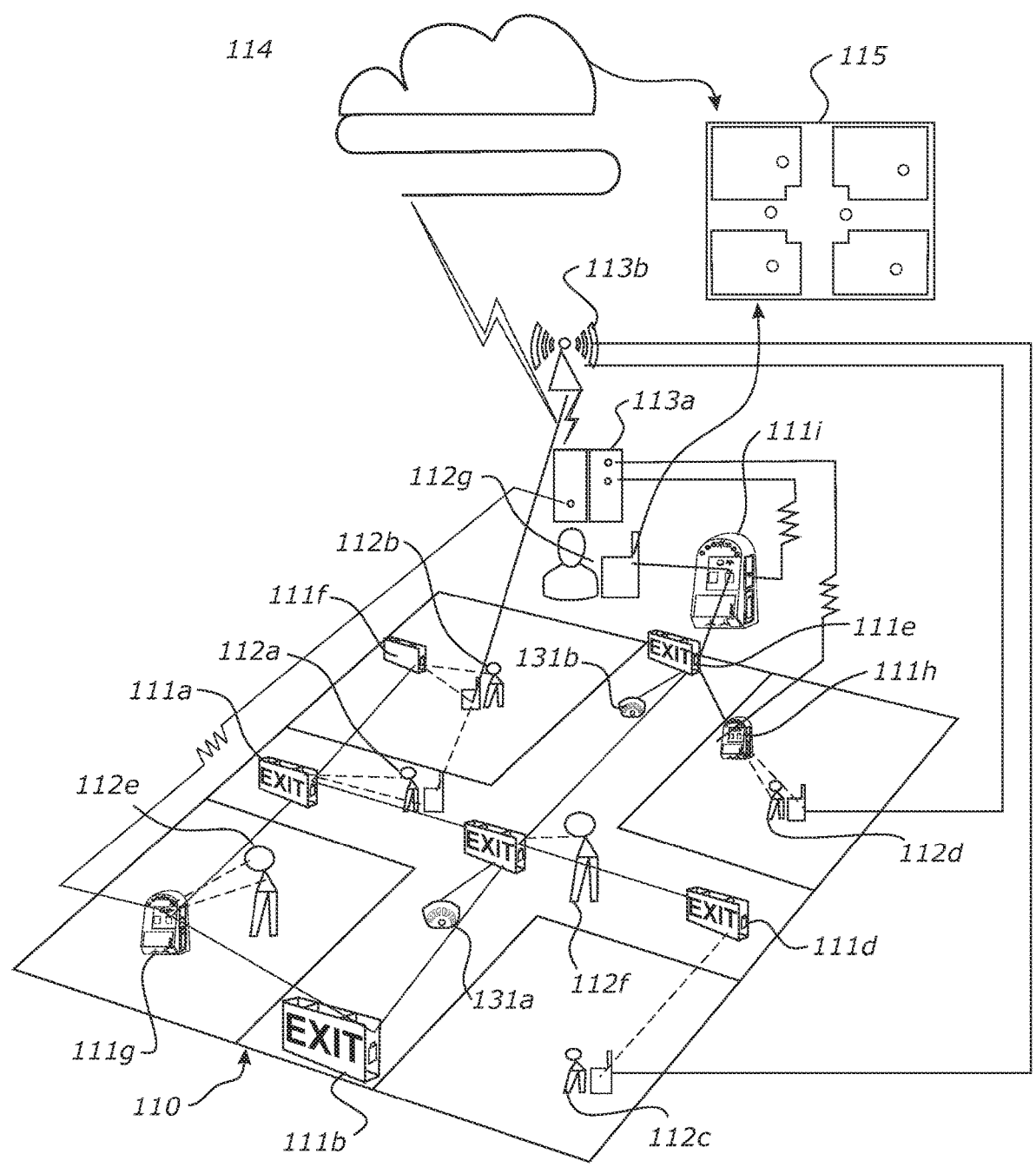
FIG. 21 shows another plan overview of one exemplary use case scenario.

FIG. 21 shows an exemplary scenario in which normal lighting and WiFi internet access facilities in the building are down. In this scenario, the on-site building manager/warden/security officer can use mobile device 112g to monitor the location of persons. In this scenario mobile device 112g connects to luminaire 111i, which may be located in a control room office and the like. This allows the onsite building manager/warden/security officer to take advantage of the power backup functionalities configured in the luminaire 111i to charge up their mobile device 112g. If the UPS in luminaire 111i is operating in the first stage, and the UPS is running low, the building manager/warden/security officer can still use their mobile device 112g to connect with any luminaire 111i if the UPS switches to operating on the second stage.

Figure 22:
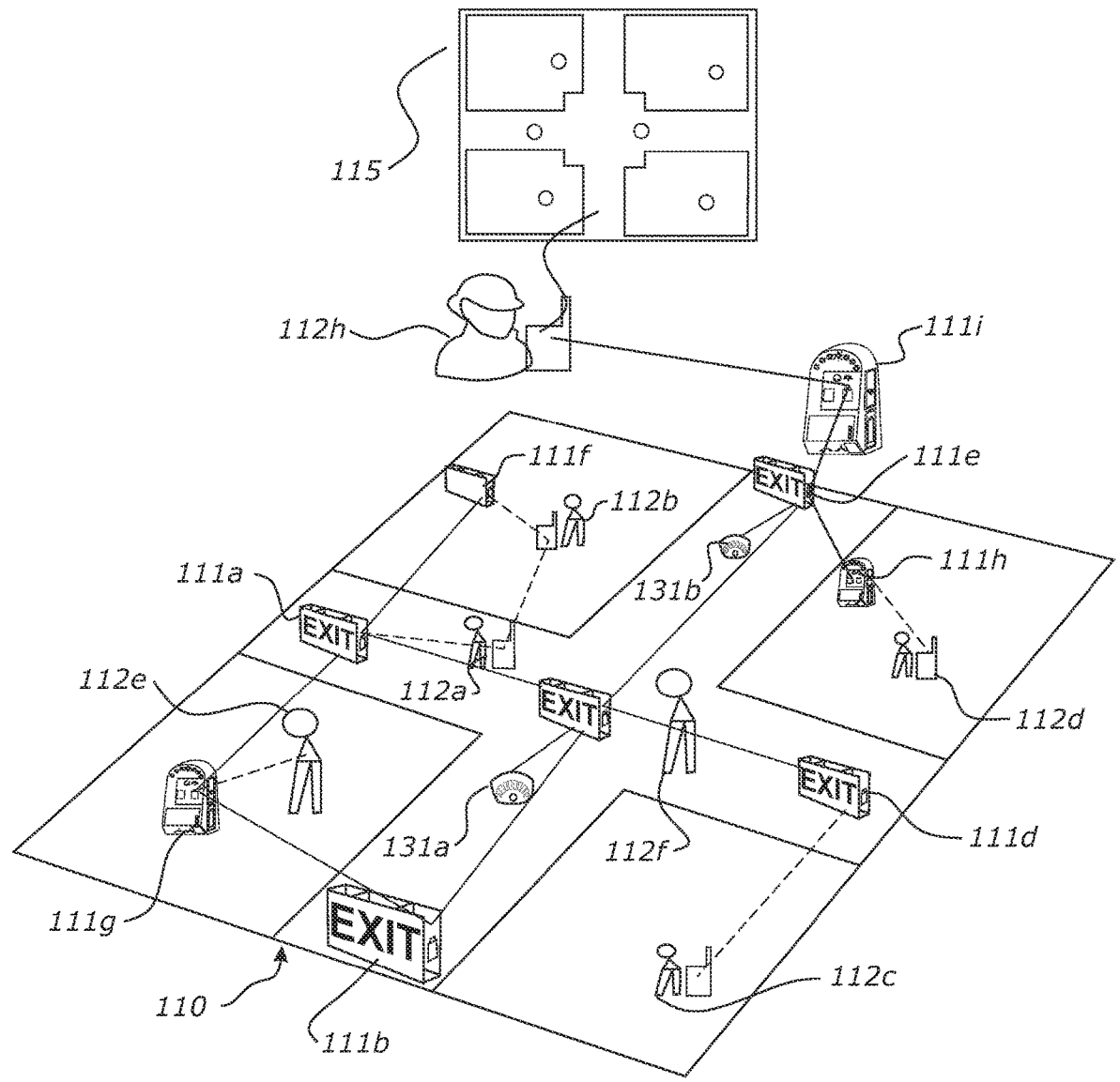
FIG. 22 shows another plan overview of one exemplary use case scenario.

FIG. 22 shows an exemplary scenario in the case of an extreme natural disaster, in which the online server 114 may not be working. Rescuers (such as emergency first responders) can rely on mobile device 112h to maintain a BLE connection with luminaire 111i and/or any other node (including luminaires 111a-h) that has a UPS operating in the second stage. This allows rescuers to locate building occupants in need of assistance.

Figure 23:
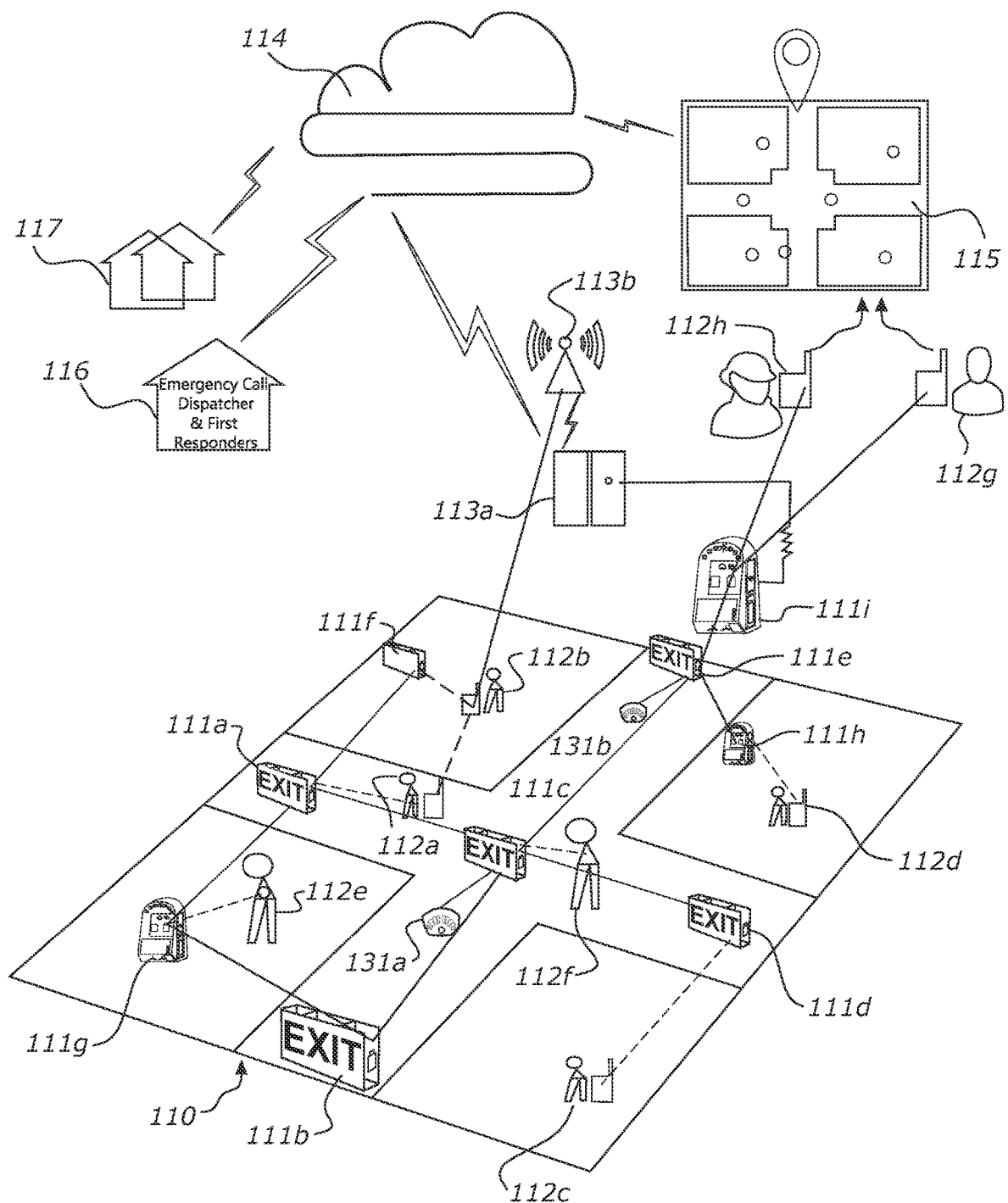
FIG. 23 shows another plan overview of one exemplary use case scenario.

FIG. 23 shows an exemplary scenario in which emergency call dispatchers, emergency first responders 116 and other parties of interest 117 can access data relating to the position of building occupants in a building by accessing the data on their mobile device 112h. Realtime data of detection, position/location of presence of persons may be displayed online and/or offline on mobile devices 112g, h in graphical representations.

Some Preferred Features

Preferably parameters of the Bluetooth transceiver and/or beacon transmitter may contain the horizontal and vertical address information of the present invention emergency luminary apparatus deployed in the building.

Preferably, the Bluetooth transceiver and/or beacon transmitter may be integrated in the above-mentioned detection and/or position module; and/or coupled to the UPS individually using Universal Serial Bus protocols.

Preferably the person's detection and/or positioning component comprises one or more components being one or more of: motion detector using PIR and or heat sensor and the like.

Preferably the controller can facilitate bluetooth beacon mesh networking communications, and communications with environment sensors, such as thermostat for temperature/humidity, occupancy lighting switches in a building, as well as other emergency sensor devices deployed in a building, such as smoke detector, fire alarm, fire sprinklers, that may also use bluetooth mesh networking protocols.

Preferably the controller can detect a person and/or determine the location of a person in a building, collect real time information, and/or communicate the detection and/or location of the person to the system's internet server, as well as a third party (e.g. inside and/or outside the building), such as emergency services. It can do this using an external internet connectivity access point of either an existing wired and wireless communication connectivity in the building, such as optical fiber and fixed wireless and communication satellite internet service, and the like installed at the premises; or a communications gateway router integrated with the apparatus; and/or alert caller's mobile cellular online connectivity device, such as a smart cellular mobile phone.

Preferably, the controller can control the uninterruptible power supply at two stages, wherein the first stage power supply is the power supplier for supporting emergency lighting and online network communications, detection, position/locations; the second stage power supply is the power supplier for supporting offline network communications, detection, position/locations.

Preferably the controller can activate an alert on persons, either by responding to alert person's mobile communication device, or, by detecting presence of person in an event.

An alert could be, but is not limited to, those issued by persons' mobile communication devices, such as smart phone, smart watch and wearable, phablet, tablet and laptop computer; or, persons and occupants detected and positioned by the invention apparatus and system in emergency; and/or an abnormal change of physical environmental data collected and reported by the invention apparatus network.

The network of such can be controlled to: trigger the lighting modules to illuminate upon power outages, and/or warning lighting at responding to an activation event; utilise the person's detection and/or position module to detect presence of persons and/or determining their positions and their devices in the building, wherein, the beacon transmitters continuously transmit radio signals intermittently to reach persons mobile devices at variable distances within the networked beacons' effective propagation range in the building.

All mobile devices in best radio propagation range of the beacon transmitters may be detected by scanning for these radio waves when issuing alerts, which are requests in radio signal issued by alert mobile communication devices in response to the scanning of the beacon transmitters' transmission power value in RSSI; facilitate communication via the communications modules, and/or utilise the persons detection and/or position module to detect a person in a building and/or determining the position of a person in the building.

The luminaire can form a backbone infrastructure of emergency lighting local area network in plural numbers in a building, such as a high-rise, wherein, such network can be either joined by adding virtually unlimited number of the luminaire, and peripheral devices such as internet access and mobile device power backup. It might also be combined with smoke detectors, fire alarms, thermostats, fire sprinklers, occupancy lighting switches, security cameras and so on, all of which may be following the same networking protocols used by the luminaire. It may be scaled up beyond the building in network connection with other buildings from one building to another building.

The invention claimed is:

1. A luminaire with integrated communications for use in assisting persons in a building to communicate with third parties outside of the building during an abnormal event, the luminaire comprising:
    at least one lighting module providing illumination as required to meet building regulations for provision of illumination inside of a building during an abnormal event when a regular power supply might fail,
    at least one communications component facilitating communication between persons in the building and third parties outside of the building during an abnormal event when a regular power supply might fail,
    a controller,
    an uninterruptible power supply in or coupled to:
    the at least one lighting module as part of the regulatory requirement for the provision of illumination inside of the building during an abnormal event when a regular power supply might fail,
    the at least one communications component and/or controller in the absence of a regular power supply, and
    the uninterruptible power supply configured to operate in:
    a first mode of operation for a first period of time to supply a first power sufficient for at least illumination inside of the building by the at least one lighting module to meet building regulations for provision of illumination inside of the building during an abnormal event, and
    a second mode of operation for a second period of time, after which illumination inside of the building is not required to meet building regulations, to supply a second power, being lower than the first power, sufficient for at least the at least one communications component to communicate with third parties outside of the building,
    wherein the controller:
    triggers the lighting module to activate or maintain illumination inside of the building upon the abnormal event at least in the first mode of operation,
    facilitates communication via the communications between persons in the building and a third party outside of the building at least in the second mode of operation, and/or
    facilitates obtaining positioning of persons using the communications component and/or other components,
    wherein in the first mode of operation, the uninterruptible power supply provides power to all components in the luminaire, and
    wherein in the second mode of operation, the uninterruptible power supply provides power to a subset of components powered by the uninterruptible power supply operating in the first mode which excludes the lighting module and to facilitate communications with the third parties outside of the building.

2. A system for assisting persons in a building during an event comprising:
    a network of luminaires, each luminaire being according to claim 1,
    wherein the network of luminaires is controlled to:
    trigger the lighting modules to illuminate upon an activation event, facilitate communication via the communications modules, and/or utilize the persons detection and/or position module to detect a person in a building and/or determining the position of a person in the building.

3. The luminaire according to claim 1, wherein the at least one communications component includes a gateway and/or is configured to communicate with a gateway.

4. The luminaire according to claim 1, wherein:
in the first mode, the uninterruptible power supply provides power to:
the at least one lighting module,
the at least one communications component,
at least one persons detection and/or positioning component,
a Bluetooth beacon,
a gateway router, and
the controller;
in the second mode, the uninterruptible power supply provides power to:
the at least one communications component,
the at least one persons detection and/or positioning component,
the Bluetooth beacon, and
the controller; and
wherein the uninterruptible power supply is configured to switch from operating in the first mode to the second mode when power is running out; and
wherein the controller is configured to be powered by the uninterruptible power supply at all times.

5. A luminaire for use in assisting persons in a building to communicate with third parties outside of the building during an abnormal event, the luminaire comprising:
at least one lighting module providing illumination as required to meet building regulations for provision of illumination inside of a building during an abnormal event when a regular power supply might fail,
at least one communications component facilitating communication between persons in the building and third parties outside of the building during an abnormal event when a regular power supply might fail,
a controller,
a removable and/or detachable uninterruptible power supply in or coupled to the at least one lighting module, at least one communications component and/or controller in the absence of a regular power supply,
the uninterruptible power supply configured to operate in:
a first mode of operation for a first period of time to supply a first power sufficient for at least illumination inside of the building by the at least one lighting module to meet building regulations for provision of illumination inside of the building during an abnormal event, and
a second mode of operation for a second period of time, after which illumination inside of the building is not required to meet building regulations, to supply a second power, being lower than the first power, sufficient for at least the at least one communications component to communicate with third parties outside of the building,
wherein the controller:
triggers the lighting module to activate or maintain illumination upon an activation event,
facilitates communication via the communications between persons in the building and a third party outside of the building at least in the second mode of operation, and/or
facilitates obtaining positioning of persons using the communications component and/or other components,
wherein in the first mode of operation, the uninterruptible power supply provides power to all components in the luminaire, and
wherein in the second mode of operation, the uninterruptible power supply provides power to a subset of components powered by the uninterruptible power supply operating in the first mode which excludes the lighting module and to facilitate communications with the third parties outside of the building.

6. A system for assisting persons in a building during an event comprising:
a network of luminaires, each luminaire being according to claim 5,
wherein the network of luminaires is controlled to:
trigger the lighting modules to illuminate upon an activation event,
facilitate communication via the communications modules, and/or
utilize the persons detection and/or position module to detect a person in a building and/or determining the position of a person in the building.

7. The luminaire according to claim 5, wherein:
in the first mode, the uninterruptible power supply provides power to:
the at least one lighting module,
the at least one communications component,
at least one persons detection and/or positioning component,
a Bluetooth beacon,
a gateway router, and
the controller;
in the second mode, the uninterruptible power supply provides power to:
the at least one communications component,
the at least one persons detection and/or positioning component,
the Bluetooth beacon, and
the controller; and
wherein the uninterruptible power supply is configured to switch from operating in the first mode to the second mode when power is running out; and
wherein the controller is configured to be powered by the uninterruptible power supply at all times.

8. A luminaire for use in assisting persons in a building to communicate with third parties outside of the building during an abnormal event, the luminaire comprising:
at least one lighting module providing illumination as required to meet building regulations for provision of illumination inside of a building during an abnormal event when a regular power supply might fail,
at least one communications component facilitating communication between persons in the building and third parties outside of the building during an abnormal event when a regular power supply might fail,
a controller,
an uninterruptible power supply in or coupled to the at least one lighting module, the at least one communications component and the controller in the absence of a regular power supply,
the uninterruptible power supply configured to operate in:
a first mode of operation for a first period of time to supply a first power sufficient for at least illumination inside of the building by the at least one lighting module to meet building regulations for provision of illumination inside of the building during an abnormal event, and a second mode of operation for a second period of time, after which illumination inside of the building is not required to meet building regulations, to supply a second power, being lower than the first power, sufficient for at least the at least one communications component to communicate with third parties outside of the building, wherein the controller:

triggers the lighting module to activate or maintain illumination upon an activation event, facilitates communication via the communications between persons in the building and a third party outside of the building at least in the second mode of operation, and facilitates positioning of persons using the communications component and/or other components, and wherein the communications component allows the person to obtain assistance by instigating communications to the outside of the building in the absence of regular power supply, wherein in the first mode of operation, the uninterruptible power supply provides power to all components in the luminaire, and wherein in the second mode of operation, the uninterruptible power supply provides power to a subset of components powered by the uninterruptible power supply operating in the first mode which excludes the lighting module and to facilitate communications with the third parties outside of the building.

9. A The luminaire according to claim 8, wherein the luminaire has an address including: information about physical location of the building the luminaire is located at, as well as information about physical positioning of the at least one lighting module in the building.

10. A The luminaire according to claim 8, wherein the controller facilitates obtaining a positioning of persons based on the address of the at least one lighting module by using the at least one communications component and/or other components.

11. A The luminaire according to claim 8, further comprising at least one persons detection and/or positioning component, wherein the controller utilizes the persons detection and/or position component to detect a person in a building and/or determining the position of a person in the building.

12. A The luminaire according to claim 8, wherein each communications component comprises one or more communications components being one or more of:
a Wi-Fi transceiver,
gateway,
a 3GPP transceiver,
Bluetooth transceiver, and
removable router/RF signal enhancer.

13. A The luminaire according to claim 8, wherein each person's detection and/or positioning component comprises one or more components being one or more of:
proximity sensor,
Motion detector,
GPS transceiver,
BLE beacon,
Wi-Fi transceiver,
3GPP transceiver, and or
Modem router/RF signal enhancer.

14. The luminaire according to claim 8, wherein the controller facilitates communications between a mobile communications device on a person in the building and a third party outside the building using one or more of the at least one communications component(s).

15. A The luminaire according to claim 8, wherein the controller detects a person and/or determine the location of a person in a building, and/or communicate the detection and/or location of the person to a third party outside the building using the at least one communications component(s).

16. The luminaire according to claim 8, further comprising one or more of:
one or more power sockets for powering external devices from the uninterruptible power supply,
a chargeable torch removably coupled to the at least one lighting module and/or triggered to illuminate on an activation event, and
an AC power supply.

17. The luminaire according to claim 8, wherein:
in the first mode, the uninterruptible power supply provides power to:
the at least one lighting module,
the at least one communications component,
at least one persons detection and/or positioning component,
a Bluetooth beacon,
a gateway router, and
the controller;
in the second mode, the uninterruptible power supply provides power to:
the at least one communications component,
the at least one persons detection and/or positioning component,
the Bluetooth beacon, and
the controller; and
wherein the uninterruptible power supply is configured to switch from operating in the first mode to the second mode when power is running out; and
wherein the controller is configured to be powered by the uninterruptible power supply at all times.

18. A system for assisting persons in a building during an event comprising:
a network of luminaires, each luminaire being according to claim 8,
wherein the network of luminaires is controlled to:
trigger the lighting modules to illuminate upon an activation event,
facilitate communication via the communications modules, and/or
utilize the persons detection and/or position module to detect a person in a building and/or determining the position of a person in the building.

* * * * *